(12) United States Patent
Somanadhan

(10) Patent No.: US 11,473,706 B2
(45) Date of Patent: Oct. 18, 2022

(54) UNDERGROUND PIPE COUPLINGS FOR EMERGENCY REPAIR DURING PIPE BREAKAGE

(71) Applicant: Nikhil Earat Somanadhan, Kochin (IN)

(72) Inventor: Nikhil Earat Somanadhan, Kochin (IN)

( * ) Notice: Subject to any disclaimer, the term of this patent is extended or adjusted under 35 U.S.C. 154(b) by 337 days.

(21) Appl. No.: 16/634,647

(22) PCT Filed: Sep. 3, 2018

(86) PCT No.: PCT/IB2018/056699
§ 371 (c)(1),
(2) Date: Jan. 28, 2020

(87) PCT Pub. No.: WO2019/064089
PCT Pub. Date: Apr. 4, 2019

(65) Prior Publication Data
US 2021/0116060 A1    Apr. 22, 2021

(51) Int. Cl.
*F16L 55/18*    (2006.01)
*F16L 27/053*    (2006.01)
*F16L 37/18*    (2006.01)

(52) U.S. Cl.
CPC ............. *F16L 27/053* (2013.01); *F16L 37/18* (2013.01); *F16L 55/18* (2013.01)

(58) Field of Classification Search
CPC ......... F16L 9/22; F16L 27/053; F16L 27/023; F16L 27/06; F16L 37/18; F16L 55/18; F16L 37/127; F16L 37/20; F16L 23/06
See application file for complete search history.

(56) References Cited

U.S. PATENT DOCUMENTS

| 3,007,720 | A | * | 11/1961 | Breitenstein | .......... | F16L 27/053 403/336 |
| 3,860,271 | A | | 1/1975 | Rodgers | | |
| 4,005,881 | A | | 2/1977 | Burton et al. | | |
| 4,186,950 | A | | 2/1980 | Billingsley et al. | | |

(Continued)

FOREIGN PATENT DOCUMENTS

| DE | 650786 | C | * | 10/1973 | | |
| DE | 4219442 | C1 | * | 6/1993 | ............ | F16L 27/053 |

(Continued)

*Primary Examiner* — Zachary T Dragicevich
*Assistant Examiner* — James A Linford
(74) *Attorney, Agent, or Firm* — Law Offices Of Steven W. Weinrieb

(57) ABSTRACT

The present invention relates to an underground pipe coupling for an emergency repair during pipe breakage and comprises a ball and socket coupling joint having a ball joint (5) which is free to rotate inside a socket joint (3) fastened by means of a ball joint backing ring (4) along with an O ring (7) positioned in between them. A pair of grip cam mounting plates (1), with grip cams (6)/double grip cams (6*a*) are provided, one of which connects at one end of the broken pipe and ball joint (5), and the other one connects the other end of the broken pipe and the socket joint (3) in a watertight manner by means of a resilient sealing ring (2) placed in between each one of them. The grip cams rotate on eccentric axes in the counterclockwise direction and prevent the decoupling of the pipe joint.

20 Claims, 13 Drawing Sheets

(56) References Cited

U.S. PATENT DOCUMENTS

Figure 1:
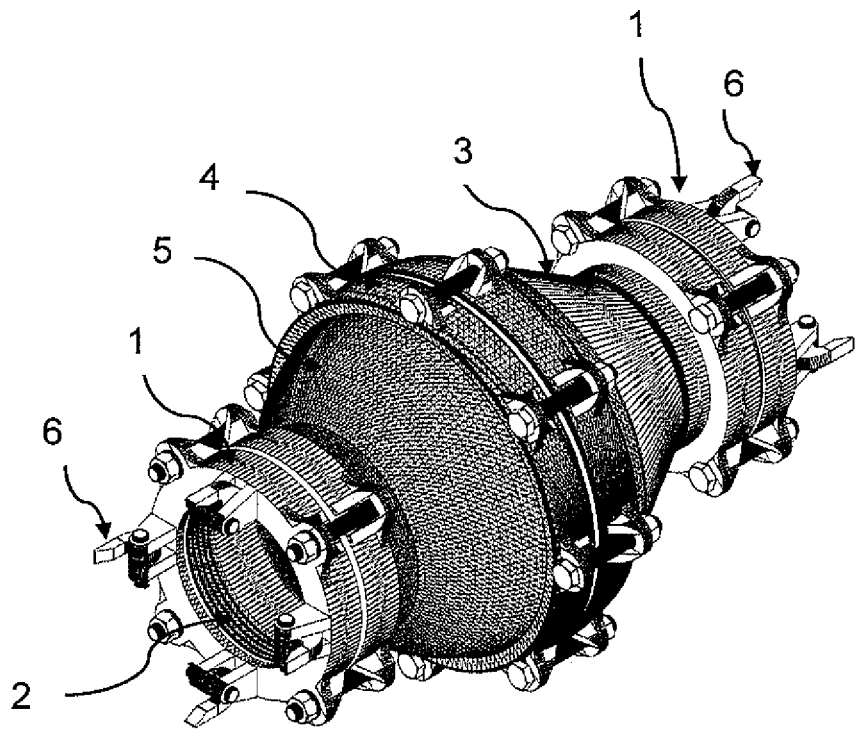

| | | | | |
|---|---|---|---|---|
| 4,222,593 | A | * 9/1980 | Lauffenburger | F16L 37/18 285/85 |
| 6,158,781 | A | 12/2000 | Aaron, III | |
| 10,473,249 | B1 | * 11/2019 | Hartman | F16L 37/18 |
| 2009/0226243 | A1 | 9/2009 | Krywitsky | |
| 2013/0341919 | A1 | * 12/2013 | Dzolovic | F16L 37/18 285/399 |

FOREIGN PATENT DOCUMENTS

| | | | |
|---|---|---|---|
| GB | 719339 | A * | 12/1954 |
| GB | 937409 | A * | 9/1963 |

\* cited by examiner

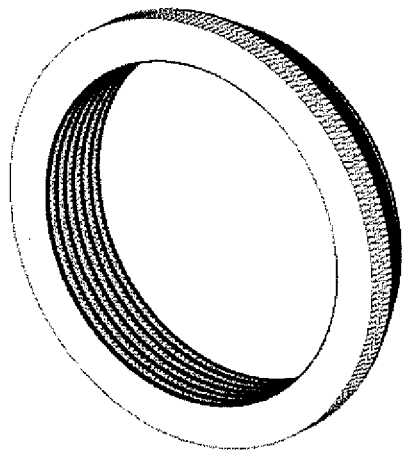
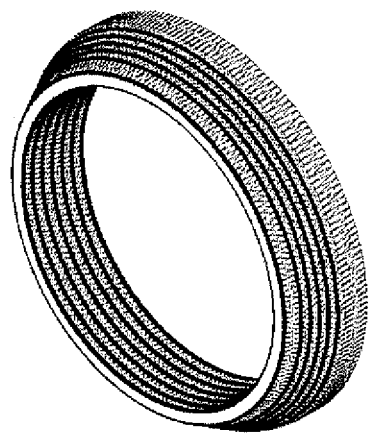
Fig.7a    Fig.7b
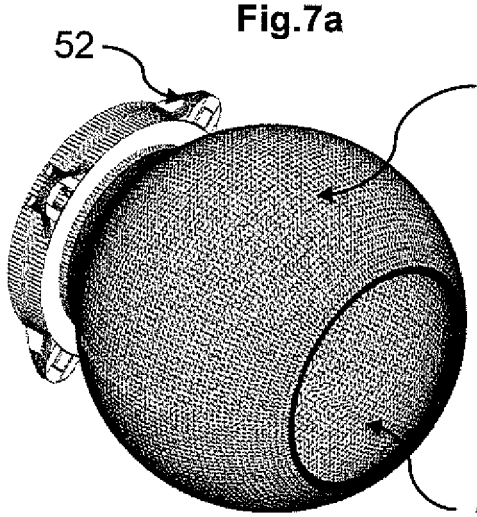
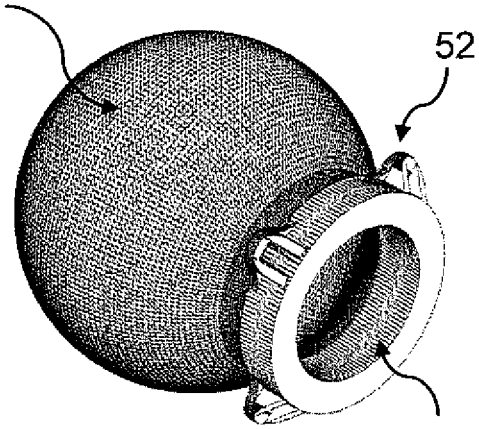
Fig.8a    Fig.8b
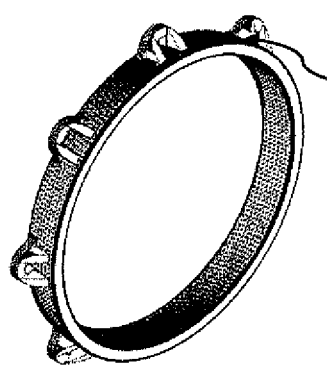
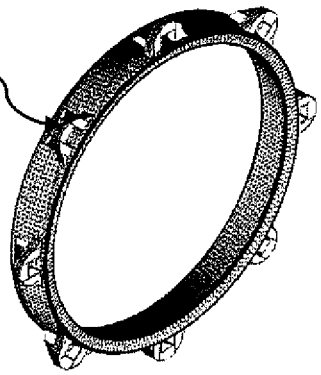
Fig.9a    Fig.9b

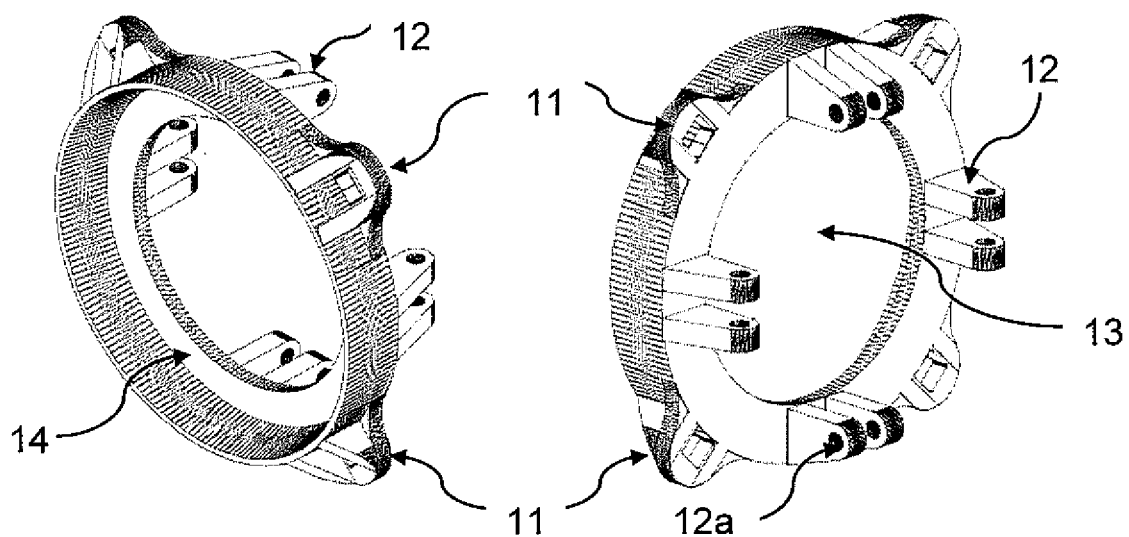
Fig.10a  Fig.10b
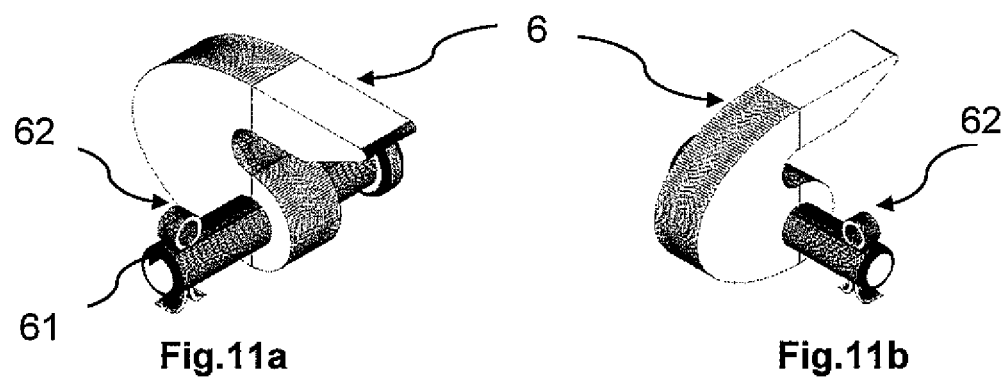
Fig.11a  Fig.11b
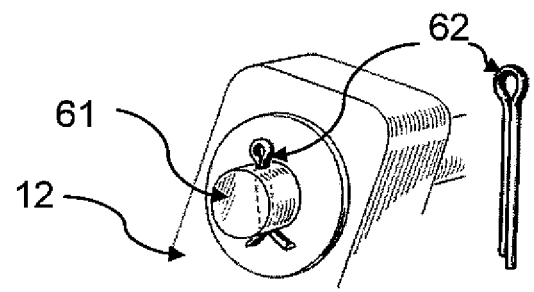
Fig.11c

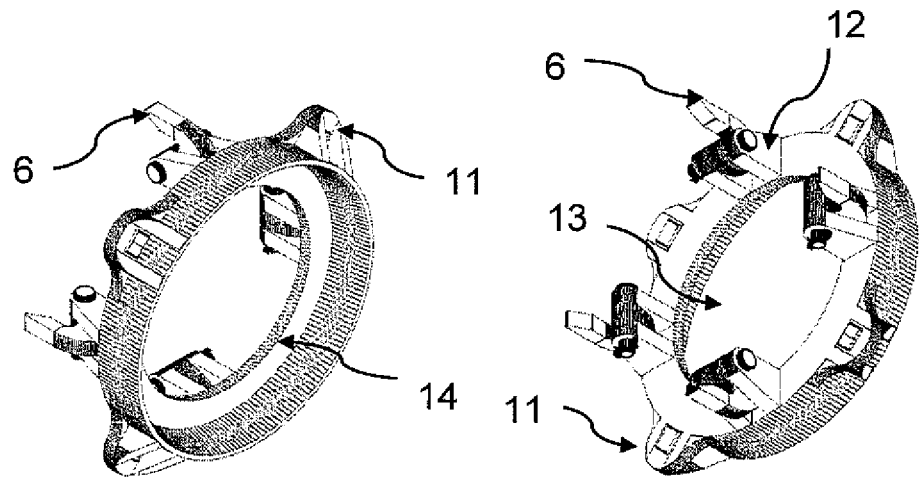
Fig.12a Fig.12b
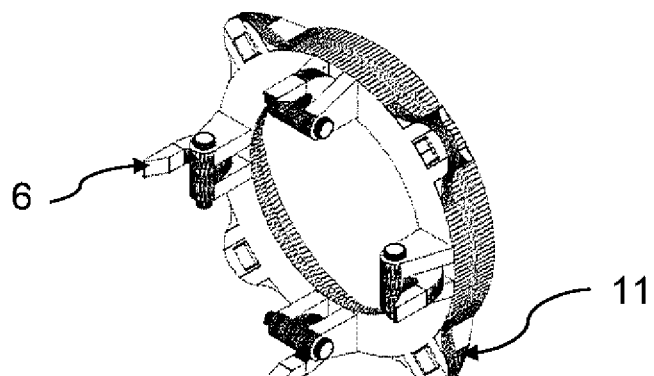
Fig.12c
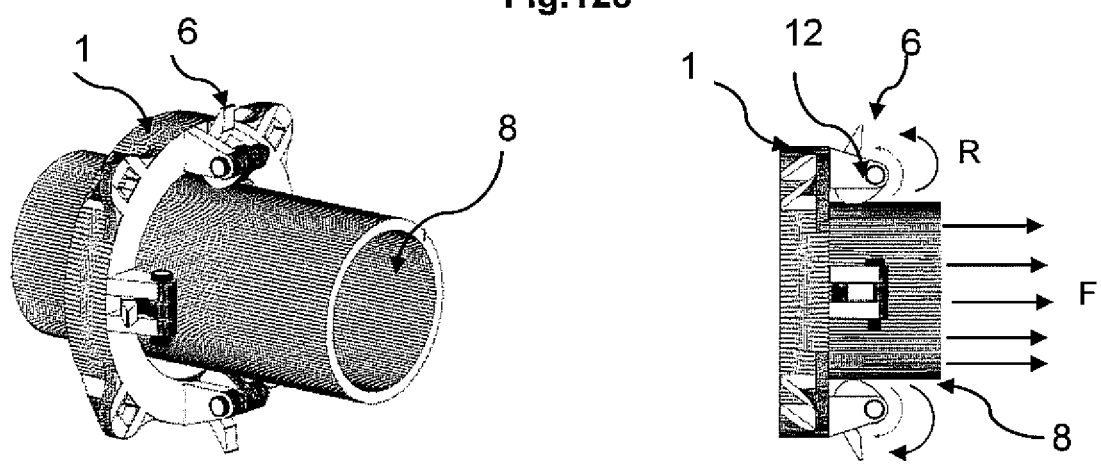
Fig.13a Fig.13b

UNDERGROUND PIPE COUPLINGS FOR EMERGENCY REPAIR DURING PIPE BREAKAGE

FIELD OF INVENTION

The present invention relates to underground pipe couplings for emergency repair during pipe breakage. More particularly by introducing a ball and socket to a mechanical coupler (connecting a plane end pipe to a plane end pipe), or a flange adapter (a plane end pipe to a flange) technology, the coupling is made feasible with a grip cam arrangement which is pull-out proof that can transfer the angular thrust to the pipe itself, while the ball and socket joint gives flexibility in any desired degree. As there is no welding, gluing, nor thrust block preparation, comparing with the current practice, the down time of repair can be considerably reduced with an economic significance. The simplicity of the product provides technological advancement in repair jobs. Hence it is a reliable solution to attend to an emergency underground pipe breakage.

BACKGROUND OF THE INVENTION

Pipe couplers are widely used in underground and above ground piping networks so as to transport fluid media, such as drinking water, sewerage, and the like. Due to alignment issues in various type of installations, and changes in geological conditions, seismic vibrations, thermal expansions, and unforeseen loads on pipes (traffic, roots of trees, chamber settlement, and the like), such events can result in pipe breakage. Hence, mechanical flexibility in couplers is therefore of paramount importance in the pipe construction industry.

Different methods or joints have been hitherto used for the repair of underground pipelines in an emergency situation in the industry. Some of the related prior art is mentioned here by way of reference.

For example, U.S. Pat. No. 2,550,536 discloses flexible pipe connections and is particularly concerned with a ball and socket pipe joint.

U.S. Pat. No. 3,276,796 relates to pipe joints and couplings of the ball and socket type, and more particularly to an improved boltless, flexible joint for coupling the ball and bell ends of adjacent cast iron pipe sections to either in a positively locked, leak-proof manner.

U.S. Pat. No. 5,624,206 discloses an apparatus and method for supporting pipe main repair tools in an excavation while repairs are being made, and requires only the exposure of the top surface of a buried main, and utilizes an anchoring system to be installed.

U.S. Pat. No. 5,078,546 relates to techniques for the removal and replacement of underground pipelines, such as gas mains, service lines and the like.

U.S. Pat. No. 4,776,617 relates to a telescopic swivel pipe joint for coupling a pair of axially spaced pipes each having a connection end comprising a pair of joint connectors and each connected to the connection end of a corresponding pipe and having a spherical bearing surface, a pair of main joint tubes each having a cylindrical portion and provided at one end thereof with an integral spherical portion for slidable contact with the bearing surface of a corresponding joint connector, and an auxiliary joint tube removably connected at both ends thereof to the respective cylindrical portions of the main joint tubes, wherein the auxiliary joint tube is telescopic in itself or telescopically fitted at one end thereof to the cylindrical portion of a corresponding main joint tube.

U.S. Pat. No. 2,475,834 discloses a flexible pipe joint comprised of a nested ball and socket type and is particularly useful in exhaust lines for internal combustion engine which are exposed to corrosive gases at high temperatures.

CA 2176464 teaches a system using an assembly for coupling coaxial pipes, such as flexible coaxial pipes, of the type used in environmentally conscious petroleum transfer systems.

While various types of pipe joints have been proposed heretofore, as can be seen from the prior art disclosures, many difficulties have been experienced in providing a joint which is truly leak-proof and which will withstand severe in-service load conditions resulting from external beam loading.

The present invention is envisaged to remove the disadvantages that have been found in the existing practices followed in the industry and in the prior art documents. Hence, I have come up with state of the art underground pipe couplings for emergency repair during pipe breakage by my extensive R&D effort. Here one can have the mechanical flexibility to said underground pipe couplings up to thirty degrees or more without sealing rubber deformation, and the degree is determined by the diameter of the ball used. This can provide a global market and is estimated to generate more than five million dollars per year according to a conservative estimate. The operational area of this application spans more than one hundred fifty countries and the end user can save significant amounts in the overall repair job of underground pipe line installations. It has wider applications in infrastructure development. Sewerage, storm water drains, irrigation lines, portable water networks, pumping stations, plant piping works, waste water treatment plants, and pipe entries to underground chambers. The area of applicability includes new construction sites, especially earthquake prone areas.

OBJECTIVES OF THE PRESENT INVENTION

Therefore the main objective of the present invention is to provide a cost effective solution, but reliable joint for the broken underground pipe lines, in situ, in an emergency situation.

Another objective of the invention is to have a simple and fast method of joining together the broken underground pipes in an emergency situation.

Yet another objective of the invention is to provide a joint in the broken underground pipe line network in an emergency situation which is having mechanical flexibility of thirty degrees or more without sealing rubber deformation.

Still another objective of the invention is to serve as a multipurpose joint giving a reasonable flexibility matching to the pipe shape and provide a reliable sealing at the jointed portion.

One more objective of the invention is to use a type of joint in the pipe line network which is most suited in earth quake prone areas.

Another objective of the invention is a reliable pipe line joint which has universal application in sewerage, storm water, irrigation lines, and portable water networks.

Yet another objective is to have a pipe line joint which can be gainfully used in pumping stations, plant piping works, and waste water treatment plants.

The above objectives of the present invention have been achieved, based on our extensive R&D work.

SUMMARY OF THE INVENTION

The present invention provides cost effective and reliable underground pipe couplings for emergency repair during pipe breakage. In the event of a pipe breakage, a conventional mechanical coupler or a flange adaptor with pipe seals are employed for joining the broken pipe sections. Here, by introducing a ball and socket to a mechanical coupler (connecting a plane end pipe to a plane end pipe) or a flange adapter (connecting a plane end pipe to a flange) technology, such makes it feasible with a grip cam arrangement which will transfer the angular thrust to the pipe itself, while the ball and socket joint gives flexibility to any desired degree. As there is no welding, gluing, nor thrust block preparation, as is being done at present, the simplicity of the product provides a technological advancement in repair jobs. Hence it is a reliable solution to attend to an emergency underground pipe breakage.

As there is no welding, gluing, nor thrust block preparation, as compared with the current practice, the down time of repair can be considerably reduced with an economic significance. Hence it is a reliable solution to attend an emergency underground pipe breakage.

The pipe coupling assembly according to the present invention is comprised of: a) Grip cam mounting plate (1) consisting of a circular ring structure having the provision for a mounting grip cam (6) on both two ends where the broken pipe has to be joined; b) a grip cam (6) which is pivoted to the grip cam mounting plate (1) that is capable of rotating and locking the pipe to prevent decoupling of the pipe joint; c) a resilient sealing ring (2) placed in between the grip cam mounting plate (1) and the socket joint (3) as well as the grip cam mounting plate (1) and the ball joint (5); d) a socket joint (3) that, in conjunction with the ball joint, takes care of the flexibility requirement that can arise from the stress caused by any environmental factors; e) a ball joint (5) which is free to slide inside the socket joint (3) thereby providing mechanical flexibility to up to 30 degree and more based on the size of ball; f) a ball joint backing ring (4) which serves to hold the ball joint (5) in position by fastening to the socket joint (3); and g) an O ring (7) for ensuring the proper sealing between the ball joint backing ring (4) and the socket joint (3).

According to another embodiment under the invention, instead of a single grip cam (6), there is provided a double grip cam (6a) that is capable of rotating and locking the pipe to prevent decoupling of the pipe joint especially in the case of a relatively large diameter pipe. The double grip cam (6a) is pivoted to a double grip cam mounting/holding block (70) which is assembled in between the modified grip cam mounting plate (1a) and the back plate (65) by means of threaded fasteners.

BRIEF DESCRIPTIONS OF DRAWINGS

Figure 2:
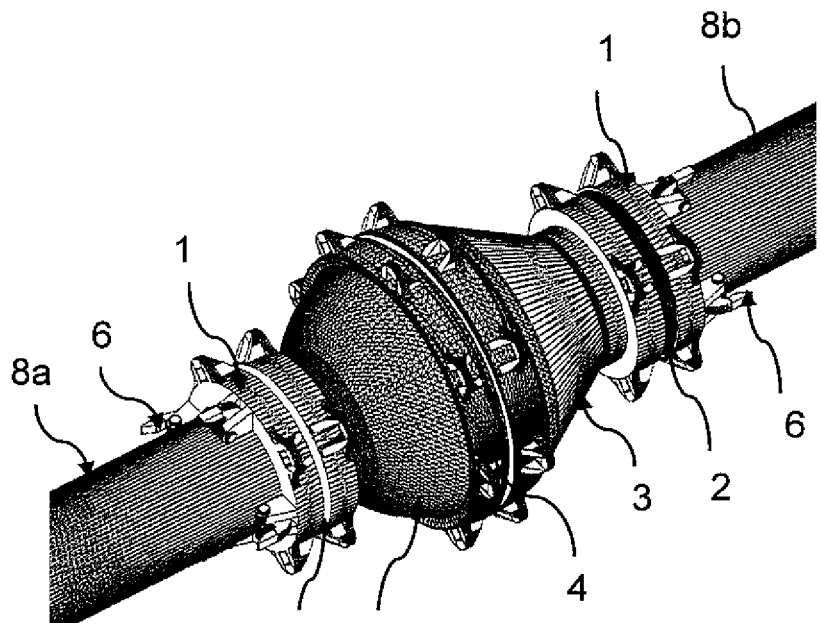
Figure 3:
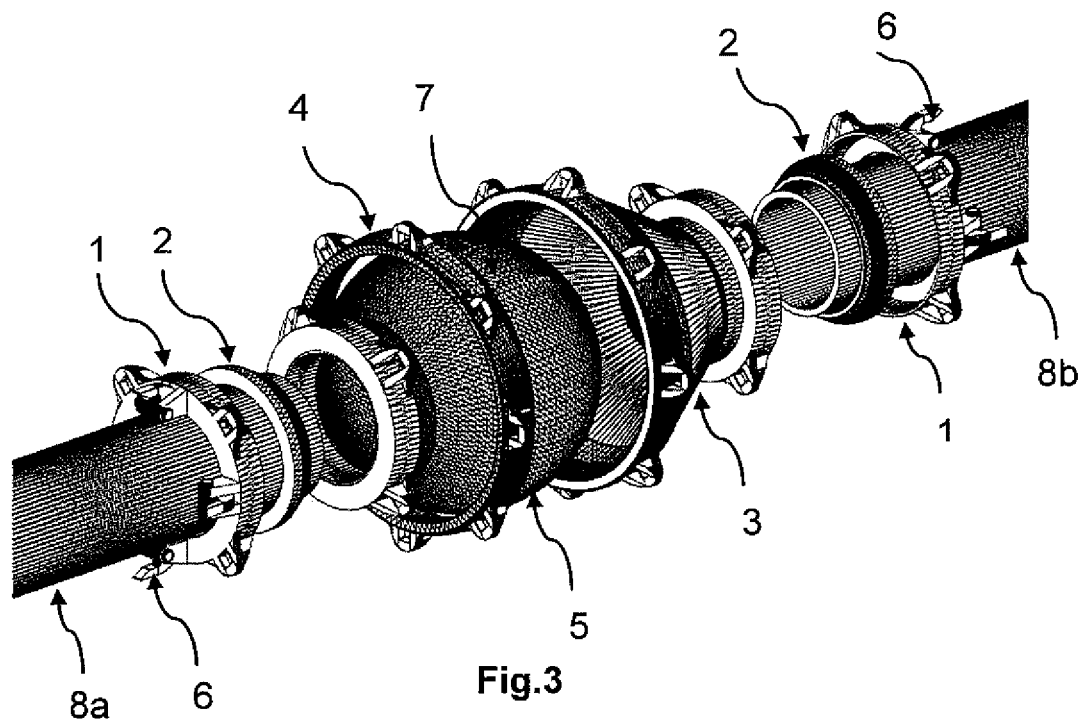
Figure 4:
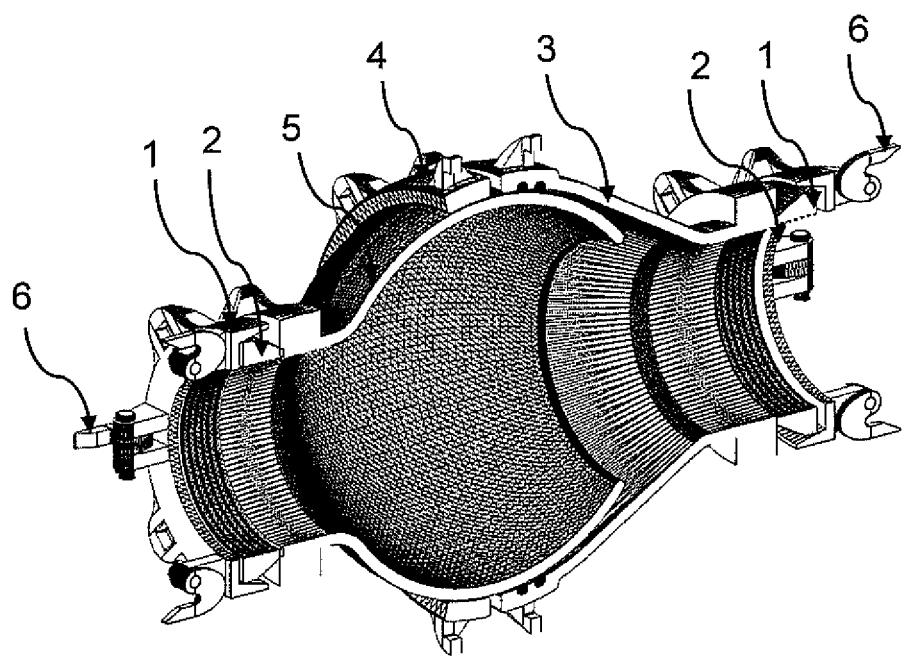
Figure 5:
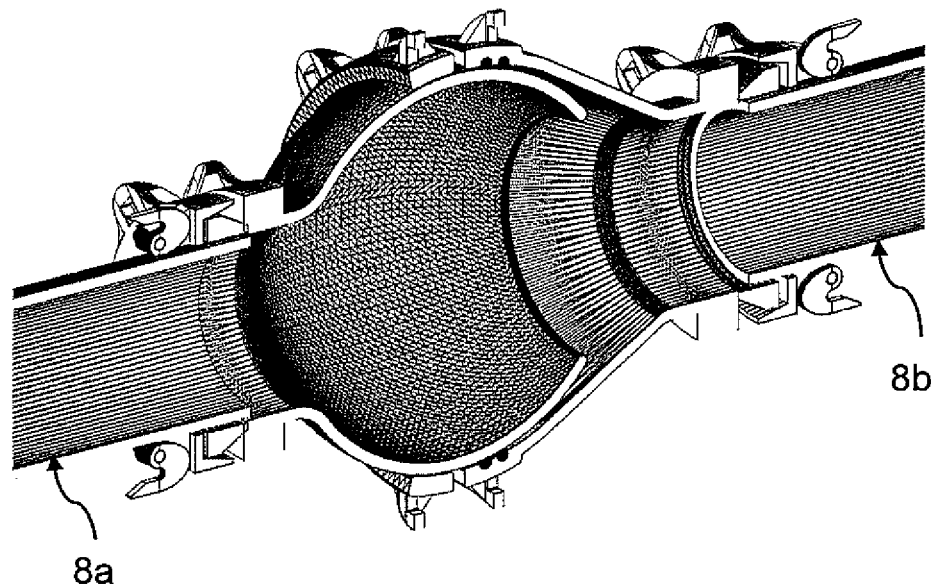
Figures 6A, 6B:
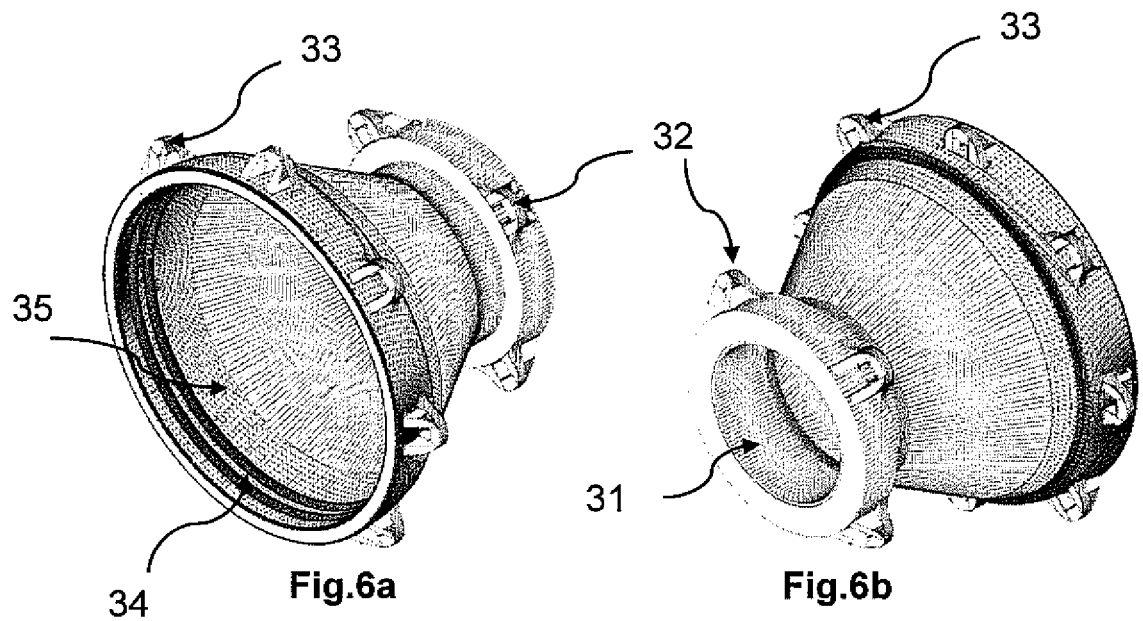
Figure 14A:
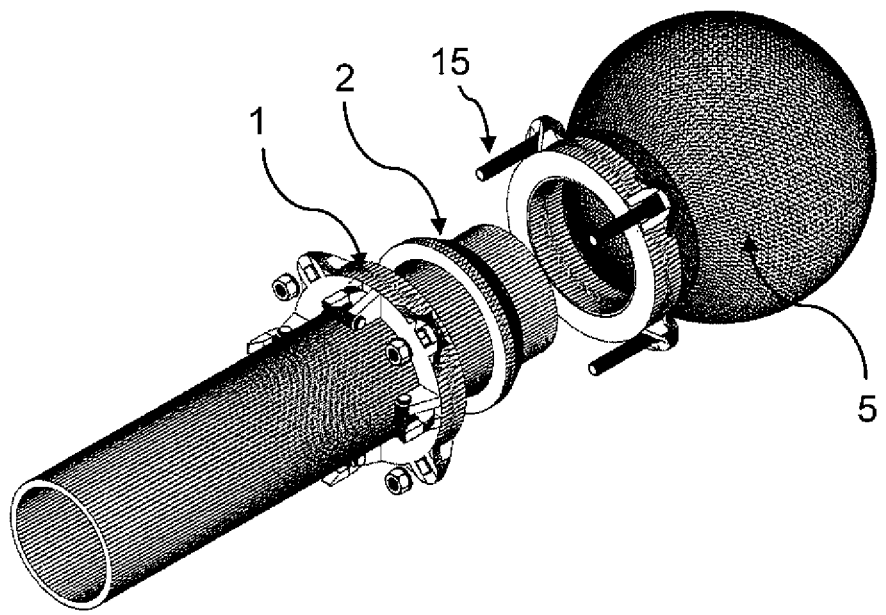
Figure 14B:
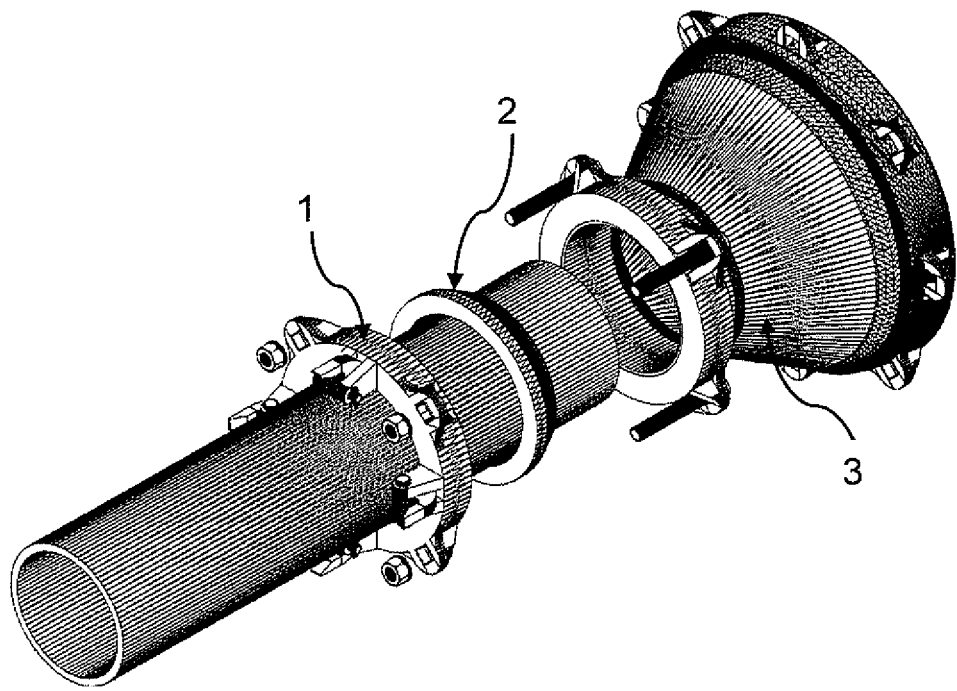
Figure 15:
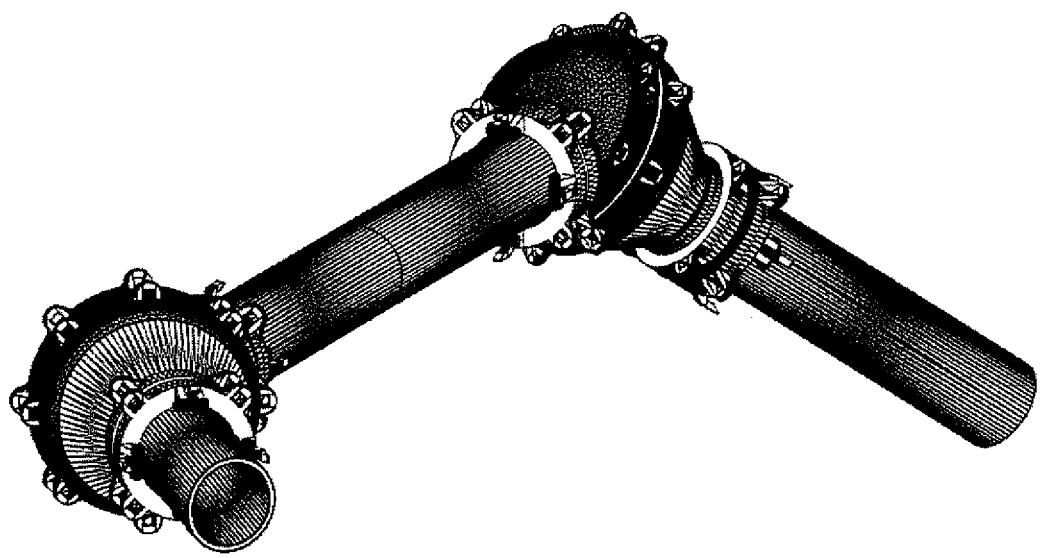
Figure 16:
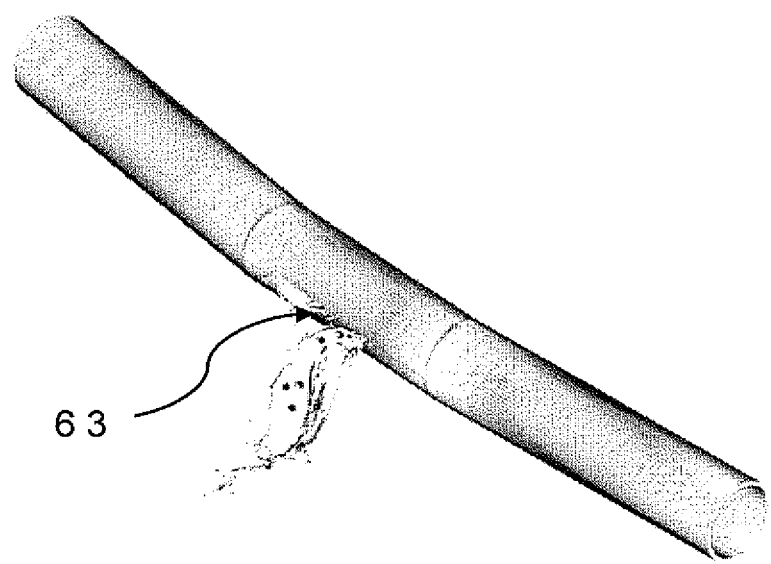
Figure 17:
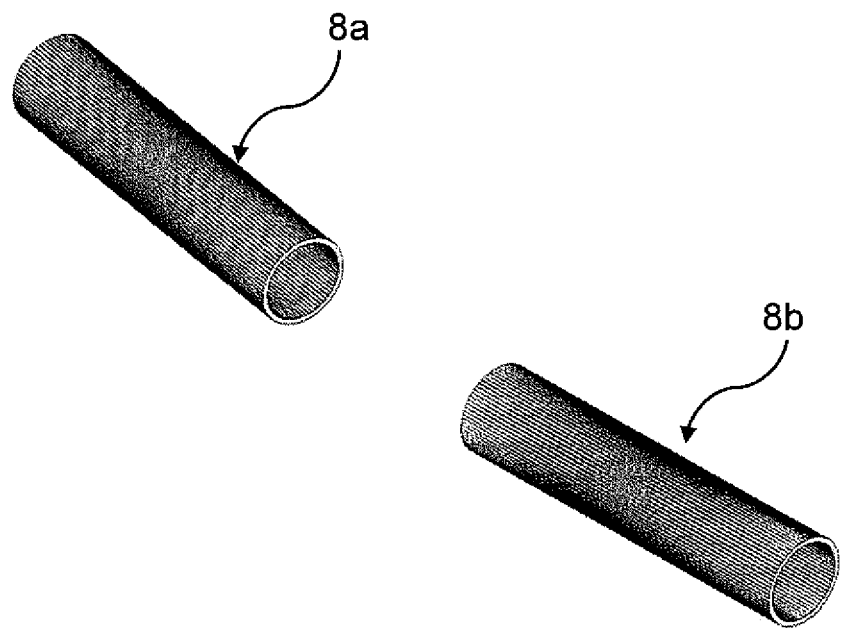
Figure 18A:
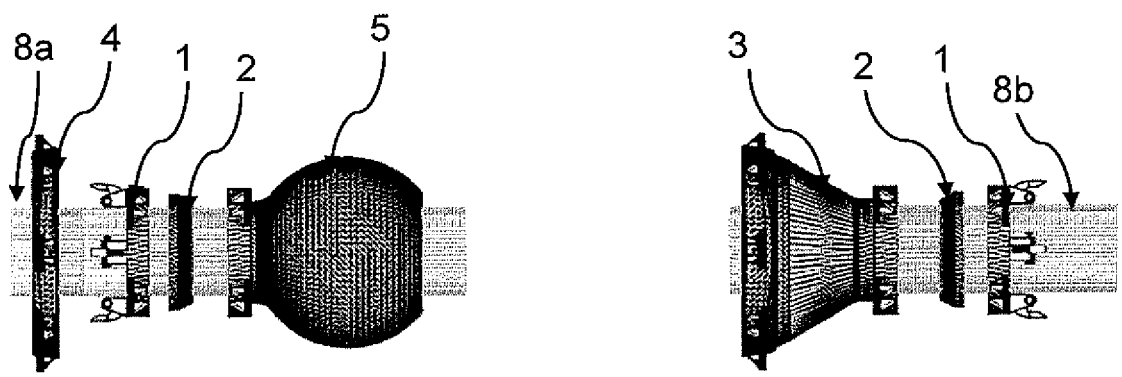
Figure 18B:
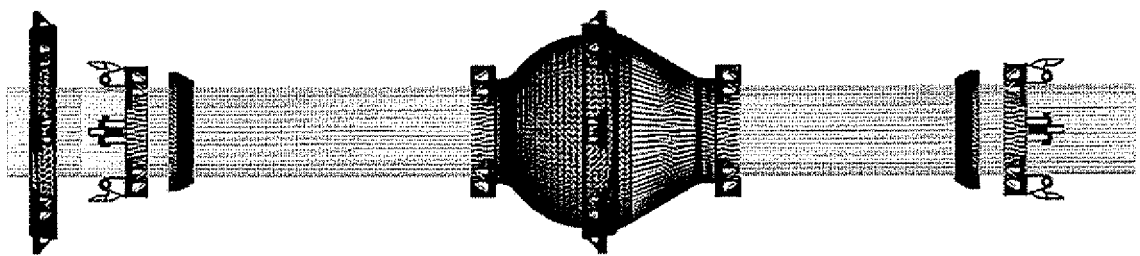
Figure 18C:
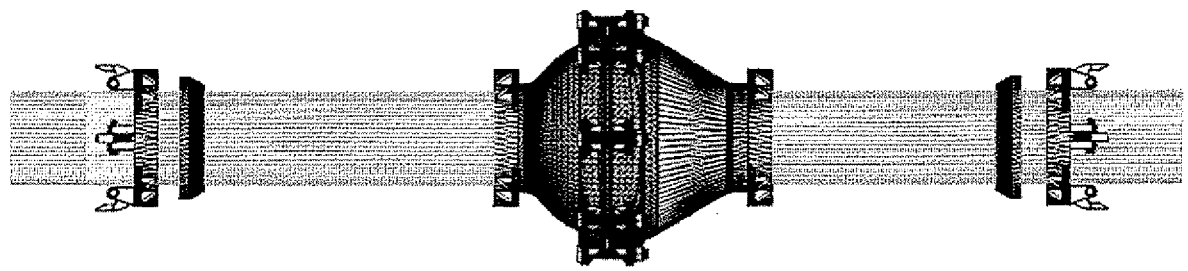
Figure 19:
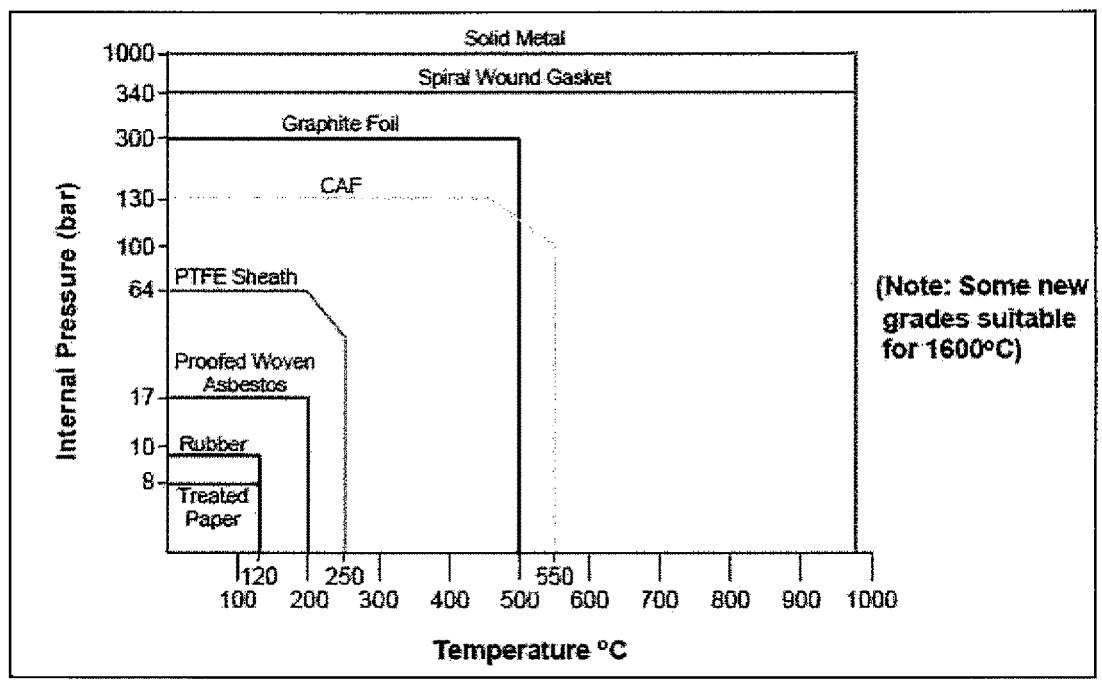
Figure 20:
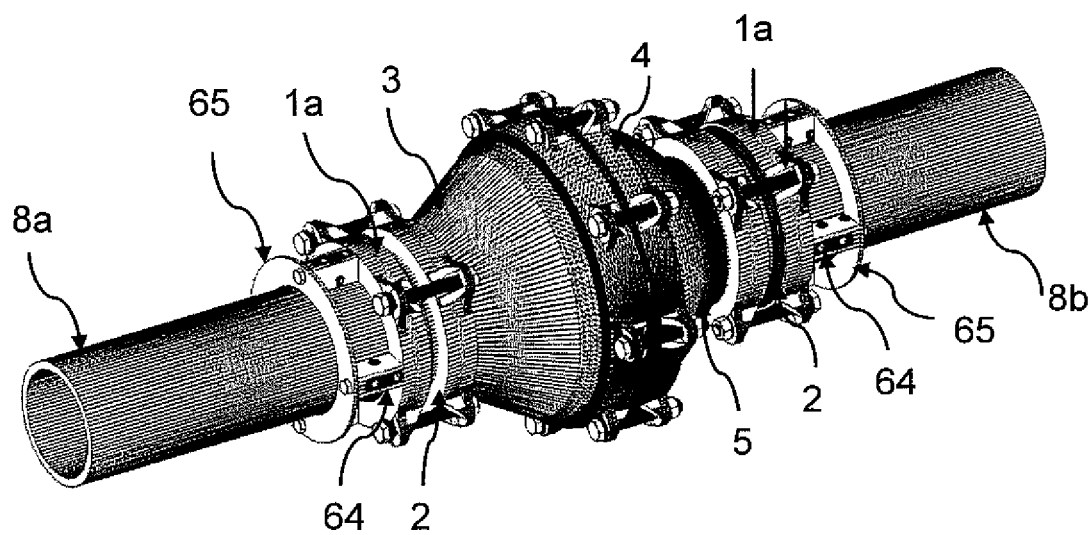
Figure 21:
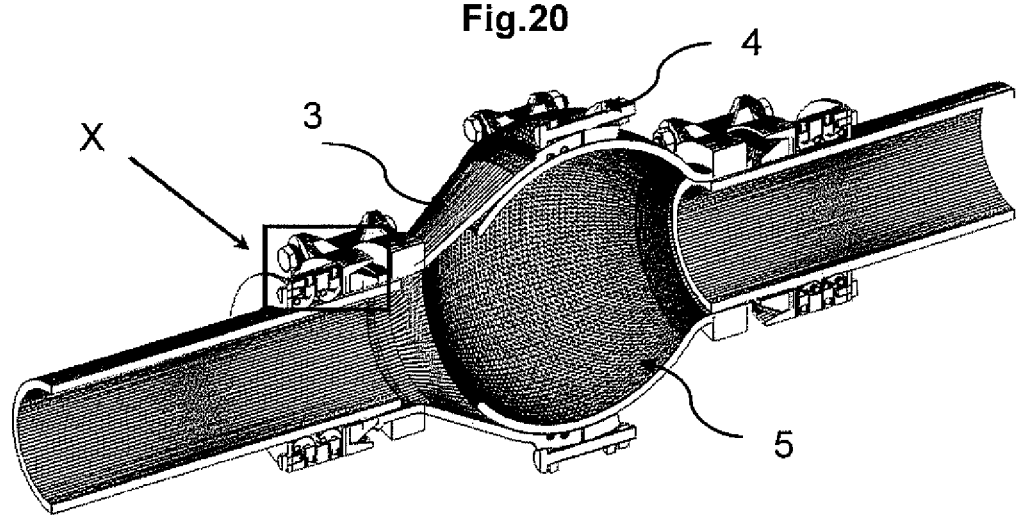
Figure 22:
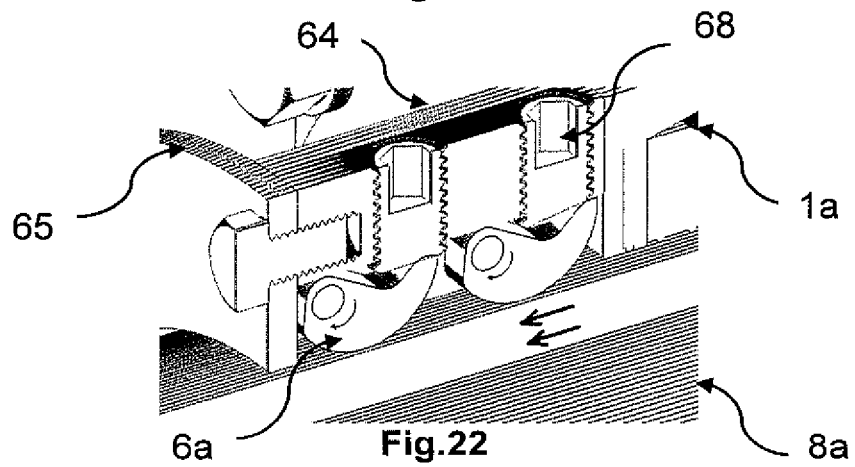
Figure 23A:
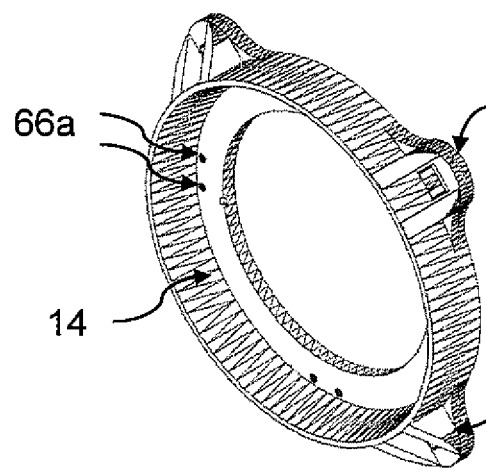
Figure 23B:
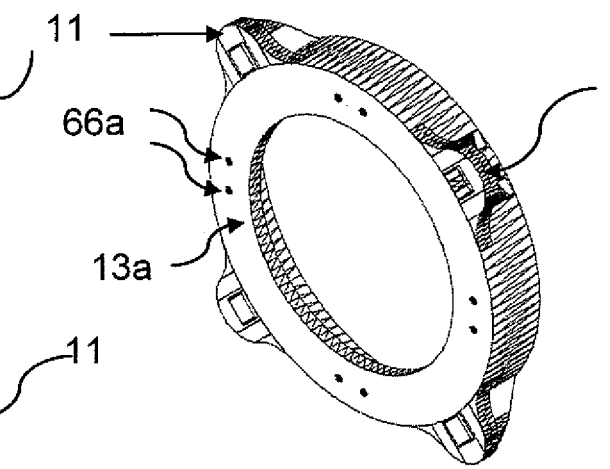
Figure 24A:
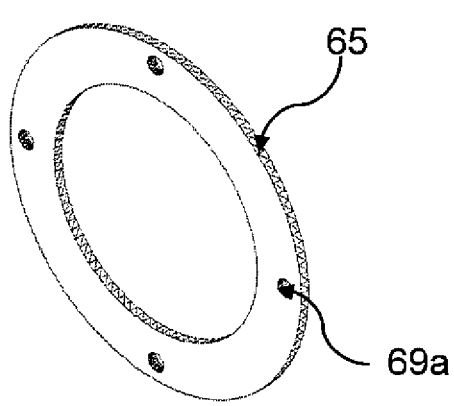
Figure 24B:
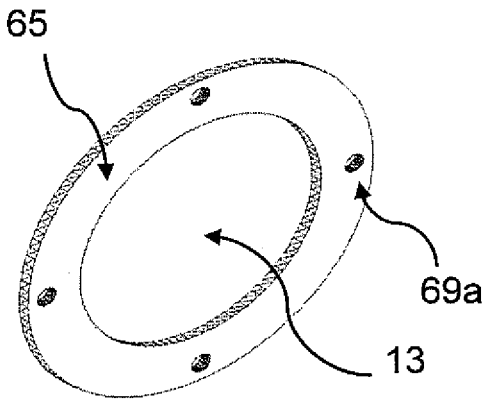
Figure 25:
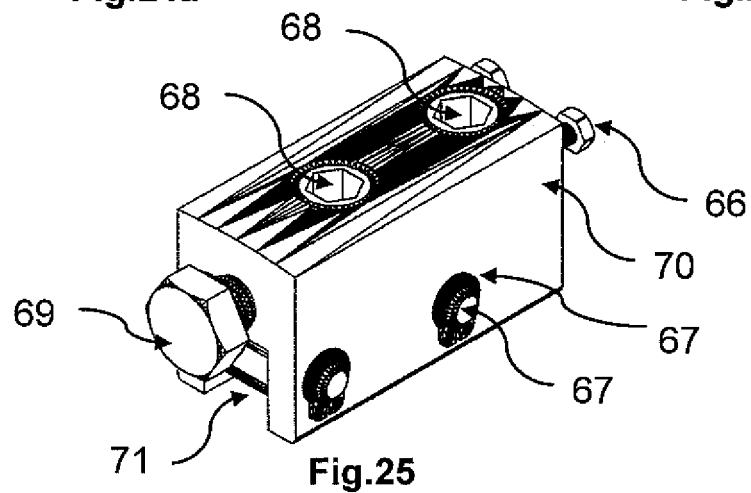
Figure 26:
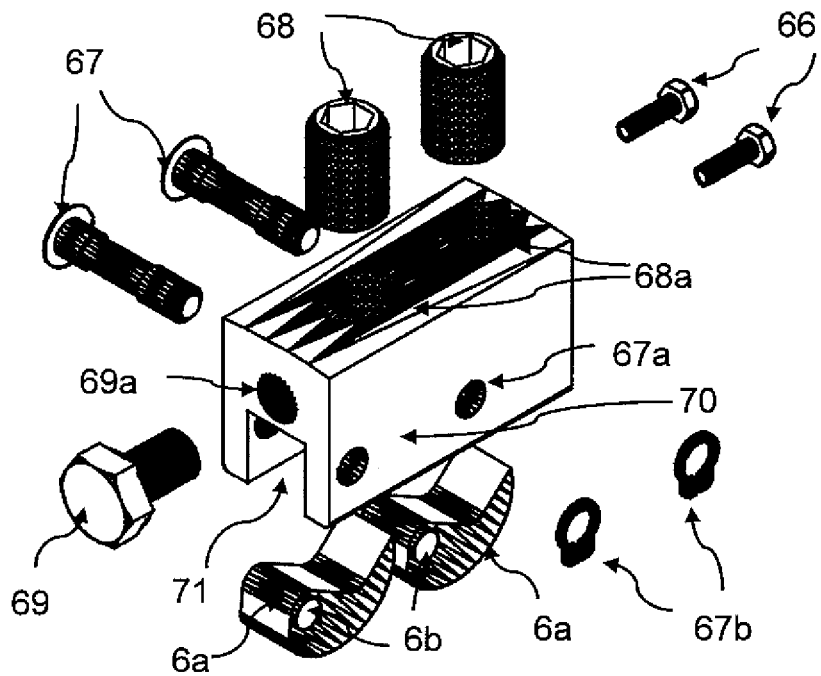

These and other features, aspects and advantages of the present invention will become better understood when the detailed description is read with reference to the accompanying drawings:

FIG. 1: Underground pipe coupling for emergency repair during pipe breakage according to an embodiment under the invention;

FIG. 2: Underground pipe coupling assembly fitted to a broken pipe as part of an emergency repair during pipe breakage according to an embodiment under the invention;

FIG. 3: Exploded view of a pipe coupling assembly fitted to a broken pipe as part of an emergency repair during a pipe breakage as shown in FIG. 2;

FIG. 4: Cross sectional view of the pipe coupling according to an embodiment under the invention shown in FIG. 1;

FIG. 5: Cross sectional view of the pipe coupling assembly fitted to a broken pipe line shown in FIG. 2;

FIGS. 6a and 6b: Front and back isometric view of the socket joint of the pipe coupling assembly;

FIGS. 7a and 7b: Front and back isometric view of the resilient sealing ring of the pipe coupling assembly;

FIGS. 8a and 8b: Front and back isometric view of the ball joint of the pipe coupling assembly;

FIGS. 9a and 9b: Front and back isometric view of the ball joint back ring of the pipe coupling assembly;

FIGS. 10a and 10b: Front and back isometric view of the grip cam mounting plate of the pipe coupling assembly;

FIGS. 11a and 11b: Front and back isometric view of the grip cam of the grip cam mounting plate of the pipe coupling assembly;

FIG. 11c is the typical arrangement of a lock pin when locked in a grip cam and split pin;

FIGS. 12a, 12b and 12c: Different isometric view of the grip cam assembled in the grip cam mounting plate of the pipe coupling assembly;

FIG. 13a: Isometric view of the grip cam mounting plate assembled with the grip cam mounted on one part of the broken pipe to be repaired;

FIG. 13b: Cross sectional view of the pipe assembled with the grip cam mounting plate showing the direction of force applied when the pipe moves away from the joint when the pressure inside the pipe increases;

FIG. 14a: Exploded view of the broken pipe assembled with the grip cam mounting plate assembled with the grip cam, resilient ring, and the ball joint;

FIG. 14b: Exploded view of the broken pipe assembled with the grip cam mounting plate assembled with the grip cam, the resilient ring, and the socket joint;

FIG. 15: Isometric view of a portion of the pipe line network having two sets of underground pipe couplings according to an exemplary embodiment under the invention;

FIG. 16: A perspective view showing the damaged/leaking pipe requiring repair;

FIG. 17: A perspective view showing the two ends of the pipe, which have been left behind after cutting away the damaged parts of the pipe line from the damaged/leaking pipe shown in FIG. 16, which are now required to be joined together;

FIG. 18a; FIG. 18b; FIG. 18c; and FIG. 18d: Different stages during the joining together of the two ends of the pipes shown in FIG. 17, by means of the ball and socket coupler with grip cam arrangement, according to the invention;

FIG. 19: Graph showing the chemical compatibility of the material used for the resilient sealing ring at different temperatures;

FIG. 20: Underground pipe coupling assembly fitted to a broken pipe as part of emergency repair during pipe breakage according to another embodiment under the present invention wherein a double grip cam (6a) is used for locking the pipe to prevent decoupling of the pipe joint especially in the case of large diameter pipes;

FIG. 21: Cross sectional view of the pipe coupling assembly having the double grip cam (6a) fitted to a broken pipe line as shown in FIG. 20;

FIG. 22: Cross sectional view of the details marked as X in FIG. 21 showing the double grip cam (6a) pivoted to the double grip cam mounting/holding block (70) which is assembled in between the modified grip cam mounting plate (1a) and the back plate (65) by means of threaded fasteners;

FIG. 23a and FIG. 23b: Front and back isometric view of the modified grip cam mounting plate (1a) to which one end of the double grip cam assembly mechanism (64) is assembled, which is a part of the pipe coupling assembly;

FIG. 24a and FIG. 24b: Front and back isometric view of the back plate (65) to which the other end of the double grip cam assembly mechanism (64) is assembled, which is part of the pipe coupling assembly;

FIG. 25: Isometric view of the double grip cam assembly mechanism (64);

FIG. 26: Exploded view of the double grip cam assembly mechanism (64) showing various components; and FIGS. 27a and 27b: Isometric views of the double grip cam mounting/holding block (70) pivoted with the double grip cam (6a) assembled in between the modified grip cam mounting plate (1a) and the back plate (65) by means of threaded fasteners.

REFERENCE LIST OF COMPONENT ASSEMBLY PARTS

Wherein 1—Grip cam mounting plate; 1a—Modified grip cam mounting plate; 2—Resilient sealing ring; 3—Socket joint; 4—Ball joint backing ring; 5—Ball joint; 6—Grip cam; 6a—Double grip cams; 6b—holes of the grip cam; 7—O-ring; 8a—First part of the broken pipe; 8b—Second part of the broken pipe; 11—Bolting eye of grip cam mounting plate; 12 —Grip cam holding jaw of grip cam mounting plate; 12a—Hole for pivoting the pin of the grip cam; 13—Pipe admission path of the grip cam mounting plate; 14—resilient ring pushing face of the grip cam mounting plate; 15—Fastener (bolt); 31—resilient ring seat area for the socket joint; 32—Bolting eye of the socket joint for the grip cam mounting plate; 33 —Bolting eye of the socket joint for the ball joint backing ring; 34—O-ring grove of the socket joint (3); 35—Bell mouth area; 41—Bolting eye of the ball joint back ring for the socket joint; 51—Resilient ring seat area for the ball Joint; 52—Bolting eye of the ball joint for the grip cam mounting plate; 53—Ball Inner Path for the medium passage; 54—Ball joint sliding area; 61—Grip Cam Mounting pin; 62—Lock pin; 63—leaking portion of the pipe carrying the fluid; 64—double grip cam assembly mechanism; 65—the back plate; 66—Fastener for fixing the double mechanism assembled with the grip cams to the modified grip cam mounting plate; 66a—Threaded hole for fastening the double mechanism assembled with the grip cams to the modified grip cam mounting plate; 67—Cam shaft for pivoting the double grip cam in the slot of the double grip cam mounting/holding block from the side; 68—Grub screw; 68a—Threaded hole for pilot loading the cams (6a) from the top of the double grip cam mounting/holding block; 69—Fastener for fixing the double mechanism assembled with the grip cams to the back plate; 69a—threaded hole for the fastener for fixing the double mechanism assembly to the back plate; 70—Double grip cam mounting/holding block before assembly; 71—Rectangular slot provided in the double grip cam mounting/holding block (70) for fixing the double grip cams (6a).

DETAILED DESCRIPTION OF THE INVENTION

The present invention relates to an underground pipe coupling for emergency repair during pipe breakage. During a pipe breakage, the normal pattern seen is that the broken pipes will be misaligned (non-coaxial), that is, the centerline of both the pipes will not match and there will be an angle or an offset in the original pipe. In the normal circumstances, in the event of a pipe breakage, a conventional mechanical coupler or a flange adaptor with pipe seals are employed for joining the broken pipe sections together. Here the resilient sealing ring gives a slight flexibility of thirty degrees basically based on the resilience property of the gasket used. Hence, an additional number of couplers have to be employed to achieve the desired angle or offset in the pipe. However, due to the change in the centerline, there will be a resultant force and the vector will be not be along the center line which will result in decoupling when the pipe line is pressurized. To avoid this, concrete blocks, known as thrust blocks, are used to arrest the movement to avoid decoupling. In order to obviate such problems, I have introduced a ball and socket coupler with a grip cam arrangement for joining the pipe line sections together, especially when the breakage is underground. In other words, by introducing a ball and socket to a mechanical coupler (connecting a plane end pipe to a plane end pipe), or a flange adapter (connecting a plane end pipe to a flange) technology along with a grip cam arrangement, the ball and socket joint gives flexibility to any desired degree, while the grip cam transfers the angular thrust to the pipe itself. As there is no welding, gluing, nor thrust block preparation, as compared with the current practice, the down time of repair can be considerably reduced with an economic significance. Hence it is a reliable solution to attend an emergency underground pipe breakage.

An underground pipe coupling for emergency repair during pipe breakage comprises the following: a pair of grip cam mounting plates (1) consisting of a circular ring structure having a grip cam holding jaw (12) for mounting a grip cam (6) as well as a bolting eye (11) for connecting the ball joint (5)/socket joint (3), one of which connects one end of the broken pipe (8a) and the ball joint (5), while the other one connects the other end of the broken pipe (8b) and the socket joint (3) in a watertight manner by means of a pair of resilient sealing rings (2), each placed in between the grip cam mounting plate (1) and the ball joint (5), as well as between the grip cam mounting plate (1) and the socket joint (3).

The grip cam (6) provided therein is capable of rotating on an eccentric axis of the grip cam mounting pin (61) mounted on the grip cam holding jaw (12) of the grip cam mounting plate (1) and made to rotate in an counter-clockwise direction for locking the broken pipes together so as to prevent decoupling of the pipe joint. Here the role of the grip cam is multifunctional. It provides reasonable flexibility to match to the pipe shape, even if it is oval, and exerts uniform pressure on the resilient sealing rings (2), a plurality of such grip cams being provided as per the circumference of the pipe, thereby providing reliable sealing. The grip cam will transfer the angular or linear thrust created by the pressure of the fluid inside the pipe to the pipe itself, while the ball and socket joint gives the flexibility to any desired degree.

The resilient sealing ring (2) used here is tapered along the circumference on its outer periphery and is the mating part with the socket joint (3) as well as with the ball joint (5). It is placed in between the grip cam mounting plate (1) and the socket joint (3) as well as between the grip cam mounting plate (1) and the ball joint (5) so as to ensure proper water tight sealing.

The ball joint backing ring (4) provided therein is having about 8 or more bolting eyes (41) for fastening the ball joint (5) and the socket joint (3) together. An O ring (7) is placed between the ball joint backing ring (4) and the socket joint (3) so as to ensure proper sealing. The socket joint (3) in conjunction with the ball joint (5) takes care of any flexibility requirements due to stresses caused by environmental factors. Ball joint (5) is free to slide inside socket joint (3) and gives a mechanical flexibility up to 30 degrees or more based on the size of the ball.

FIG. 1 depicts a pipe coupling according to the invention showing all the salient features of the invention, while FIG. 2 shows the broken pipe joined together by means of the pipe coupling according to the instant invention. An exploded view of the broken pipe joined together by means of the pipe coupling assembly according to the present invention is shown in FIG. 3. A cross sectional view of the pipe coupling assembly shown in FIG. 1 is illustrated in FIG. 4. Similarly, a cross sectional view of the broken pipe joined together by means of the pipe coupling according to the instant invention is illustrated in FIG. 5.

Referring to FIGS. 10a and 10b, the grip cam mounting plate (1) is provided with four bolting eyes (11) for fastening ball joint (5) as well as socket joint (3) using fastener bolts (15). The number of bolting eyes (11) varies depending on the size of the coupler. Similarly, the grip cam holding jaw (12) provided therein holds the grip cams (6) in position which has a hole (12a) where the grip cam gets mounted and is free to rotate as per the pipe moment in the linear direction which is detailed in FIGS. 11a and FIG. 11b.

FIG. 14a illustrates how the pipe is assembled with the ball joint (5) through the resilient sealing ring (2) and the grip cam mounting plate (1). Similarly, FIG. 14b illustrates how the pipe is assembled with the socket joint (3) through the resilient sealing ring (2) and the grip cam mounting plate (1).

Another purpose of the grip cam mounting plate (1) is to squeeze the resilient sealing ring (2) so as to make the pipe joint leak proof.

One end of the pipe which is to be joined is inserted into the pipe admission path (13) of the grip cam mounting plate. The resilient sealing ring (2) is placed on the resilient ring pushing face (14) and when the fasteners are tightened, the grip cam mounting plate (1) pushes the sealing ring (2) and gets closer to the socket joint (3) and makes it water tight.

Similarly the other end of the pipe which is to be joined is inserted into the pipe admission path (13) of the grip cam mounting plate (1). The resilient sealing ring (2) is placed on the resilient ring pushing face (14) and when the fasteners are tightened, the grip cam mounting plate (1) pushes the sealing ring (2) and gets closer to the ball joint (5) and makes it water tight.

Front and back isometric views of the socket joint (3) of the pipe coupling assembly are shown in FIGS. 6a and 6b.

The resilient sealing ring (2) is tapered along the circumference on the outer periphery as shown in FIGS. 7a and 7b which is the mating part with the socket joint (3) as well as with the ball joint (5). Resilient ring seat areas (31) of the socket joint (3) are the areas where the pipe sections to be joined, enter. The fasteners are used to tighten between the bolting eyes (11) of the grip cam mounting plate (1) and the bolting eyes (32) of the socket joint (3) for fastening the grip cam mounting plate (1). The tapered section of the resilient sealing ring (2) will get squeezed between the grip cam mounting plate (1) and the resilient ring seat area of the socket joint (31), thereby sealing the gaps between the grip cam mounting plate (1), the socket joint (3), and the pipe sections so as to make such watertight. The bell mouth area (35) of the socket joint (3) is the entry point of the ball joint sliding area (54). The O ring groove (34) of the socket joint is where the O ring (2) is so positioned that it enables the sealing between the socket bell mouth (35) and the ball joint (5).

One end of the socket joint (3) is provided with a ring structure (31a), depending on the diameter of the pipe to be joined, having four or more bolting eyes (32) and also having a resilient seating ring area (31) with a diameter matching that of the pipe to be joined so that a minimum clearance is left which is sealed later on with the tapered portion of the resilient seating ring (2) when the assembly is completed. The other end of the ball joint is provided with a ring structure (35a) matching the maximum diameter of the ball joint so that it can easily enter and has eight or more bolting eyes (33) depending on the size of the ball, as well as an internal O ring groove (34), and in between is the bell mouth area (35) of the socket joint (3).

The tapered portion of the resilient ring (2) passes through the clearance between the pipe and the socket joint (3) as well as the ball joint (5). Due to its tapered cross section, when the fasteners (15) are tightened, it squeezes through the clearance gap as the tightening increases, thereby ensuring the sealing. The less the shore hardness, the greater the sealing property increases. This is attained by maintaining the concentricity of the pipe with the guiding nature of the grip cam (6). The installation is coaxial. As the sealing material is flexible, there is only less rigidity in the assembly which allows an axial flexibility between the pipe and the assembly arrangement. This makes it unique due to its flexibility as compared to prior art couplings, flange, or pipe joining arrangements. The disadvantages of the prior art coupling assemblies is that whenever the assembly gets shifted from its coaxial orientation, the resilient sealing ring or gasket hitherto used, which is made of rubber or similar material, will be subjected to non-uniform stresses and will cause gaps (clearances) to occur between the pipe and the assembly. Hence, during long term usage, they will result in leakage from the deflected areas (the less stressed areas of the sealing ring). Here comes the relevance of the grip cam arrangement. The major advantage of this invention is that the sealing ring material selection has no restriction as it need not compensate for the pipe flexibility or movement.

According to the instant invention, the grip cam arrangement in combination with the single ball and socket joint provides a synergetic effect to the entire pipe line network and takes care of any flexibility requirements that may arise[[d out the]] due to stress forces caused by environmental factors, and is able to achieve mechanical flexibility up to thirty degrees or more, as against three to six degrees of flexibility with sealing rings used in conventional pipe joints. Hence, in the present case, the resilient sealing ring (2), that is used, can be made of graphite or SS 316 spiral wound, instead of a flexible material like rubber.

The ball joint backing ring (4) shown in FIGS. 9a and 9b is a circular piece of steel ring with bolting eyes (41) having a curved profile matching the curved surface of the ball joint (5) so as slide over the ball joint outer surface (54) and allow rotation of the ball joint (5) concentrically with respect to the socket joint (3). Bolting eyes (41) of the ball joint backing ring (4) are fastened to the bolting eyes (33) of the socket joint (3) using fasteners (15) after placing the O ring (2) in the O ring groove (34) of the socket joint (3) as shown in FIG. 3. Hence, the ball joint backing ring (4) serves to hold the ball joint (5) in position.

Referring to the front and back isometric view of the ball joint (5) of the pipe coupling assembly shown in FIGS. 8a and 8b, the resilient ring seat area for the ball joint (5) is the area where one end of the broken pipe enters. Fasteners are used to tighten the bolting eyes (11) of the grip cam mounting plate (1) and the bolting eyes (52) of the ball joint (5) for fastening the grip cam mounting plate (1).

One end of the ball joint (5) is provided with a ring structure (51a) having four or more bolting eyes (52) depending on the diameter of the coupling and also has a resilient seating ring area (51) with a diameter matching that of the pipe to be joined so that a minimum clearance is left which is sealed later on with the tapered portion of the resilient seating ring (2) when the assembly is completed.

The other end of the ball joint (5) is open and is meant for the fluid medium to pass therethrough by having a diameter matching that of the pipe which is the passage for the fluid medium (53), and in between is the spherically shaped area (54) over which the bell mouth area (35) of the socket joint (3) slides.

When these fasteners are tightened, the tapered section of the resilient sealing ring (2) will get squeezed between the grip cam mounting plate (1) and the resilient seating ring area (51) of ball joint (5), thereby sealing the gaps between the grip cam mounting plate (1), the ball joint (3), and the pipe, so as to make such watertight.

The ball joint sliding area (54) is the entry point to socket joint (3) bell mouth. The O Ring in groove (34) serves as the sealing between the socket bell mouth (35) and ball joint sliding area (54). When the ball joint (5) is coupled with the socket joint (3), it is free to rotate inside the socket joint (3), thereby providing a mechanical flexibility up to thirty degrees or more, based on the size of ball.

Front and back isometric views of the grip cam mounting plate (1) of the pipe coupling assembly is shown in FIGS. 10a and 10b. The grip cam mounting plate (1) consists of four bolting eyes (11) used to fasten the grip cam mounting plate (1) to a ball Joint (5) or a socket joint (3) according to an exemplary embodiment under the invention. The number of bolts or fasteners used will vary depending on the size of the coupler. The grip cam holding jaw (12) holds the grip cams (6) in position by means of grip cam mounting pins (61).

FIG. 11a shows how the grip cam (6) is mounted on a pin (61). The grip cam (6) is pivoted to the grip cam mounting pin (61) in such a way that it is free to rotate around its axis and is tightened once the pipe assembly is completed. The grip cam mounting pin (61) is provided with a lock pin (62), known as a split pin or cotter key, which will lock grip the cam mounting pin (61) in position with the grip cam holding jaw (12).

FIG. 11c explains the typical locking details, however, the grip cam (6) is free to rotate as per the pipe movement in the linear direction which is detailed in FIGS. 11a and 11b. Different isometric views of the grip cam (6) assembled in the grip cam mounting plate (1) is shown in FIGS. 12a, 12b and 12c.

The application of the grip cam (6), as shown in FIGS. 11a and 11b, is unique in the design of mechanical couplings so as to exhibit an angular flexibility without limitations. In other words, it enables a non-coaxial pipe to couple mechanically.

An isometric view of the grip cam mounting plate (1) assembled with the grip cam (6) mounted on the broken pipe to be repaired is depicted in FIG. 13a. The operation of the grip cam (6) is illustrated in FIG. 13b. The grip cam (6) rotates on an eccentric axis on the grip cam holding jaw (12) of the grip cam mounting plate (1). The grip cam (6) is rotated counterclockwise so that the pipes align toward the center of the grip cam mounting plate (1) and protect against the possibility of coaxial misalignment of the pipes with the assembled parts of the assembly in the future. FIG. 13b shows how the grip cam (6) facilitates the tightening of the pipe joint in the event of the movement of pipe away from the joint due to any increase in pressure inside the pipe and the thrust developed as a result thereof. The arrows in FIG. 13b show the direction of movement of the grip cam (6) as well as the likely movement of the pipe.

The main advantage here is that resilient material with a lower shore hardness can be used for the resilient sealing ring, as the grip can act as a guide to maintain the concentricity of the pipe. By using a resilient material having a lower shore hardness resilient material, even highly corroded pipes can be sealed with less pipe surface preparation. The number of grip cams and the size of the cams can vary with application (pipe pressure) and diameter of the pipe. Larger diameter pipes are always subjected to ovality in pipes and the grip cams can ensure uniform clearance between the pipe and sealing areas of the socket or ball joint.

In the case of non-coaxial installations, as the pressure inside the pipe increases, the thrust pushes the pipe away from the coupler as shown by the arrow in FIG. 13b. Any movement in the pipe away from the coupler will cause the grip cam to rotate in a circular direction in a counterclockwise direction in line with the pipe movement. This is because the rolling friction on the grip cam pin (61) is less compared to the sliding friction between the contact area of the grip cams (6) and the pipe (8), mounted on its axis, thereby providing more rigid grip to the pipe. In other words, as the pressure increases, the holding grip increases this interaction, thereby rendering the coupling more reliable so as to withstand linear thermal expansions without any breakage, depending on the clearance length of the pipe provided after sealing the ring during installation.

FIG. 14a is an exploded view of the broken pipe (8) assembled with the grip cam mounting plate (1), the grip cams (6), the resilient ring (2), and the ball joint (5), whereas FIG. 14b is an exploded view of the broken pipe (8) assembled with the grip cam mounting plate (1), the grip cams (6), the resilient ring (2), and the socket joint (3). A portion of the pipeline network having two sets of underground pipe couplings according to an exemplary embodiment of the invention is illustrated in FIG. 15 to understand how the instant invention is fruitfully deployed in a pipeline network.

Figure 18D:
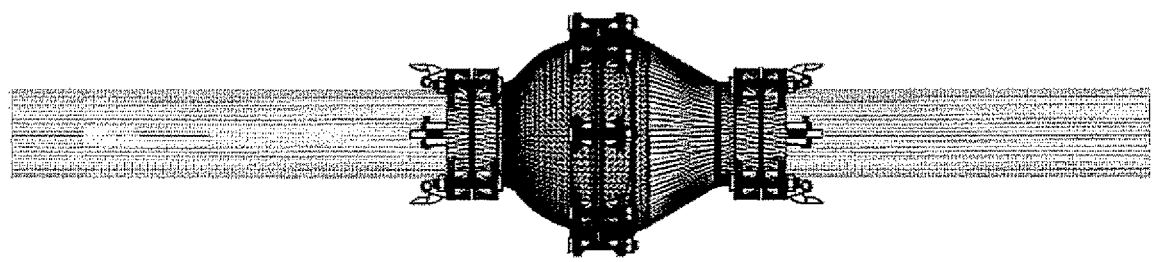

Now, the steps involved in repairing the underground pipe which is broken, as shown in FIG. 16, by means of the pipe coupling according to the present invention is given below:

Step 1: preparation of the damaged pipe for joining by cutting away the damaged part and preparing a first segment (8a) of the pipe, as well as [[the]] a second segment (8b) of the pipe, is shown in FIG. 17;

Step 2: insertion of the ball joint (5), resilient sealing ring (2), grip cam mounting plate (1), and the ball joint back ring (4) on the first segment of the pipe (8a) to be joined to the second segment of the pipe (8b), in the order as shown in FIG. 18a;

Step 3: insertion of the socket joint (3), fixed with the O ring (7), the resilient sealing ring (2), and the grip cam mounting plate (1), on the second segment of the pipe (8b) to be joined to the first segment of the pipe (8a), in the order as shown in FIG. 18a;

Step 4: coupling of the ball joint (5) and the socket joint (3) together as shown in FIG. 18b;

Step 5: clamping the ball joint (5) to the socket joint (3) by means of the ball joint back ring (4), and fastening the two joints together by means of fasteners (15) as shown in FIG. 18c;

Step 6: fastening the grip cam mounting plate (1) with the ball joint (5) by means of fasteners (15), with the resilient sealing ring (2) disposed in between, and tightening the fasteners (15) so as to ensure that the first pipe segment (8a) is properly sealed as shown in FIG. 18d;

Step 7: fastening the grip cam mounting plate (1) with the socket joint (3) by means of fasteners (15), with the resilient sealing ring (2) disposed in between, and tightening the fasteners (15) so as to ensure that the second pipe segment (8b) is properly sealed as shown in FIG. 18d;

Step 8: locking the grip cams (6) of the respective grip cam mounting plate (1), for both the first pipe segment (8a) and the second pipe segment (8b) as shown in FIG. 19a; and Step 9: wrapping the coupler with sealing tape having anti-corrosion properties. One such sealing tape used for protecting the ball and socket coupler with grip cam arrangement is Denso Tape which is a cold-applied, anti-corrosion and sealing tape based on a synthetic fabric impregnated and coated with a neutral petrolatum compound. Denso Tape is manufactured under license by Winn & Coales (Denso) Limited.

According to another embodiment under the present invention, instead of a single grip cam (6), there is provided double grip cam (6a) that is capable of rotating and locking the pipe so as to prevent decoupling of the pipe joint especially in the case of large diameter pipes, and is shown in FIG. 20. The double grip cam (6a) is pivoted to a double grip cam mounting/holding block (70) which is assembled in between the modified grip cam mounting plate (1a) and back plate (65) by means of threaded fasteners (66) and (69). A cross-sectional view of the pipe coupling assembly having the double grip cam (6a) fitted to a broken pipeline is shown in FIG. 21 for better clarity. A cross-sectional view of the details marked as X in FIG. 21 is provided in FIG. 22.

Front and back isometric views of the grip cam mounting plate (1a) of the pipe coupling assembly are shown in FIGS. 23a and 23b. The modified grip cam mounting plate (1a) comprises a circular ring structure consisting of four bolting eyes (11) which are used to fasten the modified grip cam mounting plate (1a) to a ball joint (5) or a socket joint (3). The number of bolts or fasteners used will vary depending on the size of the coupler. There is no grip cam holding jaw (12) in this embodiment under the invention, instead there is provided set of threaded holes (66a) for fastening the double grip cam mounting/holding block (70). The rear side of the modified grip cam mounting plate (1a) has a tapered section (14) so that when the fasteners are tightened between the bolting eyes (11) of the modified grip cam mounting plate (1a) and the bolting eyes 33 of the socket joint (3) for gripping the cam mounting plate (32), the bolting eyes 33 of the socket joint (3) will squeeze the resilient sealing ring (2) between the gap of the first broken pipe segment (8a) and the socket joint (3), thereby ensuring a tight water sealing. The same procedure is followed on the ball joint (5) and the second broken pipe segment (8b) for achieving tight water sealing on the second broken pipe segment (8b) side. The rest of the functions are similar to the earlier version of the grip cam mounting plate (1).

Two views of the back plate (65) are shown in FIGS. 24a and 24b. It also comprises a circular ring structure that consists of four sets of threaded holes (66a) for fastening or mounting the double grip cam mounting/holding block (70). It ensures that the double grip cam mounting/holding block (70) is positioned in between the back plate (65) and the modified grip cam mounting plate (1a).

Referring to FIG. 25 and FIG. 26, the double grip cam mounting/holding block (70) comprises a solid steel block provided with a rectangular slot (71) for accommodating the double grip cams (6a). It is provided with a) a threaded hole (68a) for inserting a grub screw (68) from the top of the block for pilot loading the double grip cams (6a) on the pipe; b) another two threaded hole on the flat side for fixing the double grip cams (6a) by means of cam shafts (67) on which the double grip cams (6a) are free to rotate on an eccentric axis and made to rotate in a counterclockwise direction for locking the broken pipe segments (8a) and (8b) so as to prevent decoupling of the pipe joint; and c) one threaded hole (69a) on one end of the double grip cam mounting/holding block (70) for fixing the back plate (65), and another two threaded holes (66a) on the other end of the double grip cam mounting/holding block (70) for fixing the modified grip cam mounting plate (1a) by means of respective threaded fasteners (69 and 66), so that the double grip cams (6a) are pivoted in the slot of the double grip cam mounting/holding block (70) in such a way that they are free to rotate on their own as per the pipe moment in a linear direction. While the grip cams (6a) are under operation, there will be a force tending to push the cams away from the pipe and lock the pipe so as to prevent decoupling of the pipe joint.

Figures 27A, 27B:
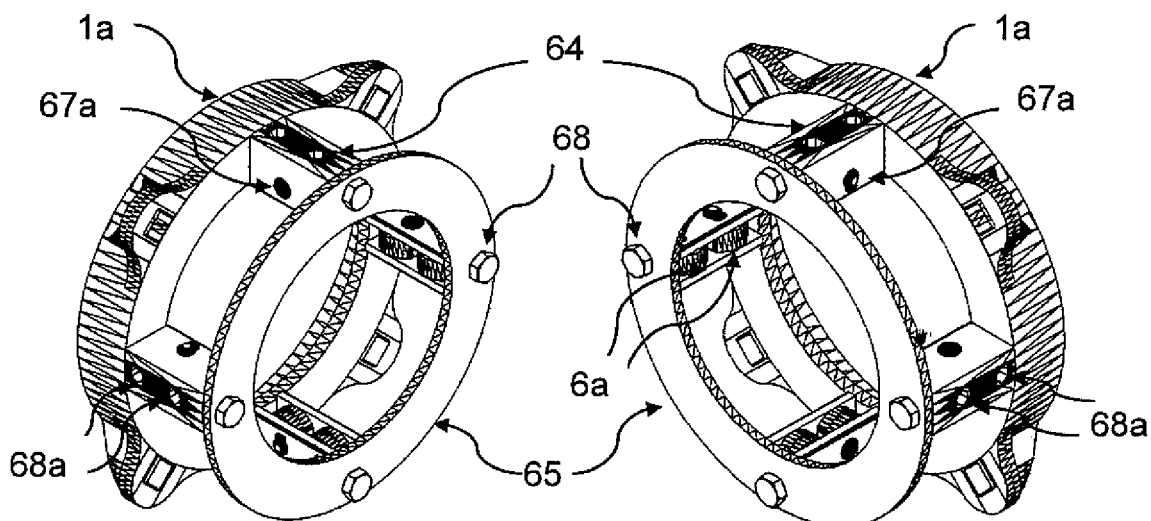

Isometric views of the double grip cam mounting/holding block (70) pivoted with the double grip cams (6a) assembled in between the modified grip cam mounting plate (1a) and the back plate (65) by means of threaded fasteners is shown in FIGS. 27a and 27b.

The method of assembling the double grip cam assembly mechanism (64) comprises the following steps:

a) placing the double grip cam (6a) in the rectangular slot (71) provided in the double grip cam mounting/holding block (70);

b) inserting the cam shaft (67) through the holes (67a) provided on the double grip cam mounting/holding block (70), through the holes (6b) in the double grip cams (6a) and locking the shaft using the circlip (67b); and c) inserting the grub screw (68) for pilot loading of the grip cams (6a) through the threaded holes (68a) provided on the double grip cam mounting/holding block (70).

The method of assembling the underground pipe coupling for emergency repair during pipe breakage when the double grip cams (6a) [[is]] are used, instead of the grip cams (6), comprises the following steps:

a) preparation of the damaged pipe for joining by cutting away the damaged part and preparing the first segment as well as the second segment;

(b) insertion of the ball joint (5), the resilient sealing ring (2), the grip cam mounting plate (1a) assembled with the grip cams (6), and the ball joint back ring (4) on the first segment of the pipe (8a) to be joined;

(c) insertion of the socket joint (3) fixed with O ring (7), resilient sealing ring (2), and the grip cam mounting plate (1a), on the second segment of the pipe (8b) to be joined;

(d) coupling of the ball joint (5) and the socket joint (3);

(e) clamping the ball joint (5) to the socket joint (3) by means of the ball joint back ring (4) and fastening by means of fasteners (15);

(f) fastening the grip cam mounting plate (1a) with the ball joint (5) by mean of fasteners (15), with resilient sealing ring (2) in between for the first segment part (8a), and tightening of the fasteners (15) so as to ensure sealing;

(g) fastening the grip cam mounting plate (1a) with the socket joint (5), by means of fasteners (15), with the resilient sealing ring (2) in between for the second segment part (8b), and tightening of the fasteners (15) so as [[it]] to ensure sealing;

(h) assembling four double grip cam assembly mechanisms (64) having the double grip cams (6a) in between the modified grip cam mounting plate (1a) and the back plate (65) by means of fasteners (66) and (69);

(i) locking the double grip cams (6a) of the respective double grip cam assembly mechanisms (64) both for the first pipe segment part (8a) and the second pipe segment part; and (j) wrapping the coupler with sealing tape having anti corrosion properties.

Apart from the repair of broken pipes, an extended usage of the present invention is its uniqueness and its capability of handling various fluid transport mediums apart from water, waste water, and the like. It can be used for the coupling of pipe transporting different types of fluids at various temperature and pressure ranges. Selection criteria for the material of construction of the various components used for the ball and socket coupler with grip cam arrangement are noted as follows:

For the grip cam mounting plate (1)/modified grip cam mounting plate (1a), socket joint (3), ball joint backing ring (4), ball joint (5), and back plate (65), the material of construction will be determined based on the chemical property and the temperature of the fluid being carried, that is, based on chemical compatibility. It can be metallic or non-metallic, such as, for example, PVC, PVDF, ductile iron, carbon steel, stainless steel, titanium, and the like. Similarly, the thickness of the component will be designed according to the fluid pressure, however the material for the grip cam must be harder than that of the pipe.

For the resilient sealing ring (2), the material of construction will be determined by the fluid chemical property, temperature, and pressure. Rubber based sealing rings, such as, for example, EPDM, Nitrile, PTFE, and the like, have limited capacities. They cannot withstand high temperatures and pressures. According to our invention, the grip cams (6)/double grip cams (6a) maintain the concentricity and the flexibility of the coupling is independent of the resilient property of the sealing ring (2). Therefore, to withstand higher temperatures and pressures, metallic or special sealing rings SS, brass, graphite, and the like can be used. It may not be out of place to mention here that if the prior art couplers use metallic sealing rings, then the coupler will be losing its flexibility when the fluid being transported is hot oil or gas having a high temperature and pressure.

Table 1 gives the material of construction of the non-metallic sealing rings with typical applications along with their temperature range.

TABLE 1

| SEALING RING MATERIAL | TYPICAL TEMPERATURE RANGE | TYPICAL APPLICATIONS |
| --- | --- | --- |
| NBR | −15° C. to 110° C. | Cooling \| LTHW \| Oils |
| NBR HT | −10° C. to 135° C. | Cooling \| LT Hot Water \| Oils |
| HYDROGENATED NBR | −10° C. to 160° C. | HT Hot Water \| Oils |
| EPDM | −25° C. to 150° C. | HT Hot Water |
| EPDM HT | −10° C. to 160° C. | HT Hot Water |
| BUTYL | −10° C. to 160° C. | HT Oils & Solvents |
| HYPALON | −10° C. to 70° C. | Specialized Chemicals |
| VITON ® (FKM) A/B/G | −5° C. to 130° C. | HT Oils & Chemicals |
| NEOPRENE | −10° C. to 80° C. | Specialized Chemicals |

Table 2 gives the material of construction of the metallic resilient sealing rings along with their temperature ranges in which they can be used.

TABLE 2

| Material | Minimum °F. | Minimum °C. | Maximum °F. | Maximum °C. | Abbreviation |
| --- | --- | --- | --- | --- | --- |
| 304 Stainless steel | −320 | −195 | 1400 | 760 | 304 |
| 316L Stainless steel | −150 | −100 | 1400 | 760 | 316L |
| 317L04 Stainless steel | | | | | 317L |
| 321 Stainless steel | −320 | −195 | 1400 | 760 | 321 |
| 347 Stainless steel | −320 | −195 | 1700 | 925 | 347 |
| Carbon Steel | −40 | −40 | 1000 | 540 | CRS |
| 20Cb-3 (Alloy 20) | −300 | −185 | 1400 | 760 | A-20 |
| HASTELLOY* B2 | −300 | −185 | 2000 | 1090 | HAST B |
| HASTELLOY* C276 | −300 | −185 | 2000 | 1090 | HAST C |
| INCOLY* 800 | −150 | −100 | 1600 | 870 | IN 800 |
| INCONEL* 600 | −150 | −100 | 2000 | 1090 | INC 600 |
| INCONEL* 750 | −150 | −100 | 2000 | 1090 | INX |
| MONEL* 400 | −200 | −130 | 1500 | 820 | MON |
| Nickel 200 | −320 | −195 | 1400 | 760 | NI |
| Titanium | −320 | −195 | 2000 | 1090 | TI |

A graph showing the chemical compatibility of the materials used for the resilient sealing ring at different temperature is given in FIG. 19.

The following are the advantages of the present invention over the prior art:

1. Enhanced mechanical flexibility compared to mechanical couplers and flange adaptors.
2. No thrust block required in angularly deflected areas.
3. Uniform stress patterns on the sealing ring enabling longer life and quality of sealing.
4. Self-aligning feature according to pipe orientations.
5. Suitable for seismic vibrations (earthquake prone areas).
6. Pipe ovality compensation/correction feature.

I have brought out the novel features of the invention by explaining some of the preferred embodiments under the invention, enabling those skilled in the art to understand and visualize the present invention. It is also to be understood that the invention is not limited in its application to the details set forth in the above description or as illustrated in the drawings. Although the invention has been described in considerable detail with reference to certain preferred embodiments thereof, various changes and modifications can be made without departing from the spirit and scope of the invention as described herein above and as defined by the appended claims.

I claim:

1. An underground pipe coupling for emergency repair during pipe breakage, provided with a ball and socket coupler joint wherein the ball joint (5) is free to rotate inside said socket joint (3), and which are fastened together by a ball joint backing ring (4) along with an O-ring (7) positioned in between them for ensuring the sealing between said ball and socket coupler joint, wherein said ball and socket coupler joint comprises:
   a) a pair of grip cam mounting plates (1), each in the form of a circular ring structure having a grip cam holding jaw (12) for mounting a grip cam (6) as well as a bolting eye (11) for connecting said ball joint (5) as well as said socket joint (3), of which one connects a first end of a first broken pipe part (8a) and said ball joint (5), while the other one connects a first end of a second broken pipe part (8b) and said socket joint (3) in a watertight manner by using a resilient sealing ring (2) placed in between each one of them;
   b) each one of said grip cams (6) being capable of rotating on an eccentric axis of a grip cam mounting pin (61) mounted on said grip cam holding jaw (12) of said grip cam mounting plate (1) and capable of rotating in a counterclockwise direction for locking said broken pipe parts together so as to prevent decoupling of said pipe joint; and
   c) a pair of resilient sealing rings (2) which are tapered along outer peripheral circumferential portions thereof and are adapted to mate with said socket joint (3) and said ball joint (5) and are placed in between said grip cam mounting plate (1) and said socket joint (3) as well as between said grip cam mounting plate (1) and said ball joint (5) so as to ensure sealing therebetween so as to complete grip cam assemblies.

2. The underground pipe coupling as claimed in claim 1, wherein:
   each one of said grip cam mounting plates (1) is circular in shape and is meant for fastening said ball joint (5) or said socket joint (3) by fasteners (15), and is provided with four or more bolting eyes (11) and an equal number of said grip cam holding jaws (12) placed in between them, wherein said number of bolting eyes (11) and said grip cam holding jaws (12) depends on the size of said coupler joint used which in turn depends on the diameter of said pipe parts to be joined together.

3. The underground pipe coupling as claimed in claim 1, wherein:
   each one of said grip cams (6) is pivoted on said grip cam holding jaw (12) of said grip cam mounting plate (1) and is held in position by said grip cam mounting pin (61) that is locked using a lock pin (62) known as a split pin or a cotter key in such a way that it is free to rotate on its own while said pipe moves in a linear direction.

4. The underground pipe coupling as claimed in claim 1, wherein:
   there are four or more grip cams (6) which are capable of rotating on eccentric axes of said grip cam mounting pins (61) mounted on said grip cam holding jaws (12) of said grip cam mounting plates (1) and are capable of rotating in a counterclockwise direction so as to lock said pipe parts together, and thereby prevent decoupling of said pipe joint, so that the pipe parts to be joined together align with the centers of said grip cam mounting plates (1) and prevent against the possibility of coaxial misalignment of said pipe parts in the future.

5. The underground pipe coupling as claimed in claim 1, wherein:
   a) one end of said ball joint (5) is provided with a ring structure (51) having four or more bolting eyes (52) on the diameter of said coupling, and also has a resilient seating ring region with a diameter matching that of said pipe part to be joined so that a minimum clearance is left, which is sealed later on, with said tapered portion of said resilient seating ring (2) when assembly of said pipe parts is completed;
   b) the other end (53) of said ball joint (5) is open and has a diameter matching that of said first pipe part through which a fluid medium passes; and
   c) in between said one end of said ball joint (5) and said other end 153) of said ball joint (5) is a spherically shaped region (54) over which a bell mouth region (35) of said socket joint (3) rotates.

6. The underground pipe coupling as claimed in claim 1, wherein:
   a) one end of said socket joint (3) is provided with a ring structure (31), depending on the diameter of the pipe part to be joined, having four or more bolting eyes (32) and a resilient seating ring with a diameter matching that of said pipe part to be joined so that a minimum clearance is left, which is sealed later on, with said tapered portion of said resilient seating ring (2) when assembly of said pipe parts is completed;
   b) the other end of socket joint (3) is provided with a bell mouth region (35) matching a maximum diametrical extent of said ball joint (5), so that it can easily enter said socket joint (3), and having eight or more bolting eyes (33) depending on the size of said ball joint (5) as well as an internal O ring groove (34); and
   c) in between said bell mouth region (35) of said socket joint (3) and said ring structure (31) is a region for accommodating said spherically shaped region (54) of said ball joint (5).

7. The underground pipe coupling as claimed in claim 6, wherein:
   said O ring (2) is positioned between said bell mouth region (35) of said socket joint (3) which comprises the region for accommodating said spherically shaped region (54) of said ball joint (5) so as to achieve the sealing between socket (3) and said ball joint (5).

8. The underground pipe coupling as claimed in claim 1, wherein:
   said resilient sealing ring (2) comprises a wide circular ring with a first end which is tapered and which passes through said clearance between said second pipe part (8b) and said socket joint (3), as well as through said clearance between said first pipe part (8a) and said ball joint (5), and a second end which is a mating part with said grip cam mounting plate (1) of said socket joint (3) and said ball joint (5).

9. The underground pipe coupling as claimed in claim 1, wherein:
   when one end of said second broken pipe part (8b), which is to be joined with said socket joint (3), is inserted into a pipe admission path (13) of a second one of said pair of grip cam mounting plates (1), said resilient sealing ring (2) is interposed between said resilient ring pushing face (14) of said grip cam mounting plate (1) and said socket joint (3), and when said fasteners (15), linking said socket joint (5) and said grip cam mounting plate (1) are tightened, said sealing ring (2) is moved closer to said socket joint (5) so as to render said socket joint (5) water tight.

10. The underground pipe coupling as claimed in claim 1, wherein:

when one end of said first broken pipe part (8a), which is to be joined with said ball joint (5), is inserted into a pipe admission path (13) of a first one of said pair of grip cam mounting plates (1), said resilient sealing ring (2) is interposed between said resilient ring pushing face (14) of said grip cam mounting plate (1) and said ball joint (5), and when said fasteners (15), linking said ball joint (5) and said grip cam mounting plate (1) are tightened, said sealing ring (2) is moved closer to said ball joint (5) so as to render said ball joint water tight.

11. The underground pipe coupling as claimed in claim 1, wherein:

said fasteners (15) are used to fasten and tighten said bolting eyes (11) of said grip cam mounting plates (1) and a) bolting eyes (32) of said socket joint (3) are used for fastening said grip cam mounting plate (1) to said socket joint (3) whereby said tapered section of said resilient seal ring (2) will get squeezed between said grip cam mounting plate (1) and said resilient ring seat area (31) of said socket joint (3), thereby sealing any gaps between said grip cam mounting plate (1), said socket joint (3), and said second broken pipe part (8b) so as to render said socket joint (3) watertight; and b) bolting eyes (52) of said ball joint (5) are used for fastening said grip cam mounting plate (1) to said ball joint (5) whereby said tapered section of said resilient seal ring (2) will get squeezed between said grip cam mounting plate (1) and said resilient ring seat area of said ball joint (51), thereby sealing any gaps between said grip cam mounting plate (1), said ball joint (3), and said first broken pipe part (8a) so as to render said ball joint (3) watertight.

12. The underground pipe coupling as claimed in claim 1, wherein:

said grip cam assemblies, in combination with said ball and socket joints provide flexibility requirement needs that arise from stresses caused by environmental factors and is able to achieve mechanical flexibility of thirty degrees or more, as against three to six degrees of flexibility as is achieved with sealing rings used in conventional pipe joints.

13. The underground pipe coupling as claimed in claim 1, wherein:

said ball joint backing ring (4) comprises a circular piece of steel ring with eight or more bolting eyes (41) matching said ring portion (35) of said socket joint (3) and having a curved profile matching said curved surface of said ball joint (5) so as to rotate around said spherically shaped region (54) of said ball joint (5) and allow rotation of said ball joint (5) concentrically with said socket joint (3), when said bolting eyes (41) of said ball joint backing ring (4) and said bolting eyes (33) of said socket joint are fastened together using fasteners (15) after inserting said O ring (2) into said O ring groove (34) of said socket joint al.

14. The underground pipe coupling as claimed in claim 1, wherein:

said spherically shaped region (54) of said ball joint (5) is adapted to enter said bell mouth region (35) of said socket joint (3), and when said ball joint (5) is coupled with said socket joint (3), said ball joint (5) is free to rotate inside said socket joint (3) thereby providing mechanical flexibility of thirty degrees or more based on the size of said ball joint (5).

15. The underground pipe coupling as claimed in claim 1, wherein:

in lieu of said grip cams (6), an equal number of double grip cam assembly mechanisms (64) with double grip cams (6a) may be provided and are pivoted in a rectangular slot of a double grip cam mounting/holding block (70) by grip cam shafts (67) which are assembled in between a) said modified grip cam mounting plate (1a), a circular ring structure with four bolting eyes (11) for fastening said modified grip cam mounting plate (1a) with said ball joint (5) on one pipe end, said socket joint (3) on the other pipe end, and a pair of threaded holes (66a) for assembling said double grip cam mounting/holding block (70) and b) a back plate (65), which is another circular ring structure consisting of sets of threaded holes (69a), for assembling said double grip cam mounting/holding block (70).

16. The underground pipe coupling as claimed in claim 15, wherein:

said double grip cams (6a), pivoted in rectangular slot of double grip cam mounting/holding block (70), are capable of rotating on eccentric axes of said grip cam shafts (67) of said double grip cam mounting/holding block (70) which are assembled in between said modified grip cam mounting plate (1a) and said back plate (65) so as to facilitate the locking of said broken pipe parts (8a,8b) to be joined together.

17. The underground pipe coupling as claimed in claim 15, wherein:

said double grip cam mounting/holding block (70) is a solid steel block provided with a rectangular slot (71) so as to fix said double grip cams (6a) therewith and is provided with:

a) a threaded hole (68a) for inserting grub screws (68) in top portions of said block for pilot loading said double grip cams (6a) onto said pipe;

b) another two threaded holes (67a) on flat sides of said double grip cam mounting/holding block (70) for fixing said double grip cams (6a) by cam shafts (67) on which said double grip cams (6a) are free to rotate;

c) one threaded hole (69a) in one end of said double grip cam mounting/holding block (70) for fixing said back plate (65); and (d) another two threaded holes (66a) on the other end of said double grip cam mounting/holding block (70) for fixing said modified grip cam mounting plate (1a) by respective threaded fasteners (66), so that said double grip cams (6a) are pivoted in said slot of said double grip cam mounting/holding block (70) in such a way that said double grip cams (6a) are free to rotate on their own axes as per pipe movement in said linear direction.

18. A method for forming an underground pipe coupling for emergency repair during pipe breakage, provided with a ball and socket coupler joint wherein the ball joint (5) is free to rotate inside said socket joint (3), and which are fastened together by a ball joint backing ring (4) along with an O-ring (7) positioned in between them for ensuring the sealing between said ball and socket coupler joint, wherein said method comprises the steps of:

providing a pair of grip cam mounting plates (1), each in the form of a circular ring structure having a grip cam holding jaw (12) for mounting a grip cam (6) as well as a bolting eye (11) for connecting said ball joint (5) as well as said socket joint (3), of which one connects a first end of a first broken pipe part (8*a*) and said ball joint (5), while the other one connects a first end of a second broken pipe part (8*b*) and said socket joint (3) in a watertight manner by using a resilient sealing ring (2) placed in between each one of them;

wherein each one of said grip cams (6) is capable of rotating on an eccentric axis of a grip cam mounting pin (61) mounted on said grip cam holding jaw (12) of said grip cam mounting plate (1) and capable of rotating in a counterclockwise direction for locking said broken pipe parts together so as to prevent decoupling of said pipe joint; and providing a pair of resilient sealing rings (2) which are tapered along outer peripheral circumferential portions thereof and are adapted to mate with said socket joint (3) and said ball joint (5) and are placed in between said grip cam mounting plate (1) and said socket joint (3) as well as between said grip cam mounting plate (1) and said ball joint (5) so as to ensure sealing therebetween so as to complete grip cam assemblies.

19. The method of assembling the underground pipe coupling for emergency repair during pipe breakage as claimed in claim 18, comprising the additional steps of:
using a modified grip cam mounting plate (1*a*) for each grip cam mounting plate (1); and
using a double grip cam (6*a*) for each grip cam (6).

20. The method of assembling the underground pipe coupling for emergency repair during pipe breakage as claimed in claim 19, wherein said method comprises a method of assembling a double grip cam assembly mechanism (64) comprising the steps of:
a) placing said double grip cams (6*a*) in a rectangular slot (71) provided in a double grip cam mounting/holding block (70);
b) inserting cam shafts (67) through holes (67*a*) provided on said double grip cam mounting/holding block (70), and through holes (6*b*) in said double grip cams (6*a*), and finally locking said cam shafts (67) using circlips (67*b*); and
c) inserting grub screws (68), for pilot loading of said double grip cams (6*a*), though threaded holes (68*a*) provided on said double grip cam mounting/holding block (70).

* * * * *